(12) United States Patent
Nakagawa et al.

(10) Patent No.: US 10,646,939 B2
(45) Date of Patent: May 12, 2020

(54) WIRE ELECTRIC DISCHARGE MACHINE

(71) Applicant: Mitsubishi Electric Corporation, Tokyo (JP)

(72) Inventors: Takayuki Nakagawa, Tokyo (JP); Makoto Nii, Tokyo (JP); Satoru Izawa, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/340,691

(22) PCT Filed: Nov. 15, 2016

(86) PCT No.: PCT/JP2016/083760
§ 371 (c)(1),
(2) Date: Apr. 10, 2019

(87) PCT Pub. No.: WO2018/092181
PCT Pub. Date: May 24, 2018

(65) Prior Publication Data
US 2019/0337070 A1    Nov. 7, 2019

(51) Int. Cl.
*B23H 7/10* (2006.01)
*B23H 1/02* (2006.01)
(Continued)

(52) U.S. Cl.
CPC ............... *B23H 7/08* (2013.01); *B23H 7/10* (2013.01); *B23H 11/00* (2013.01)

(58) Field of Classification Search
CPC ............ B23H 7/10; B23H 11/00; B23H 7/20
See application file for complete search history.

(56) References Cited

U.S. PATENT DOCUMENTS 4,581,514 A * 4/1986 Inoue .................... G01B 21/06
204/225
4,689,457 A * 8/1987 Izumiya .................. B23H 7/10
219/69.12
(Continued)

FOREIGN PATENT DOCUMENTS

JP    58-188126 U    12/1983
JP    2-39824 U     3/1990
(Continued)

OTHER PUBLICATIONS

Decision to Grant a Patent received for Japanese Patent Application No. 2017-526000, dated Oct. 3, 2017, 6 pages including English Translation.
(Continued)

*Primary Examiner* — Dana Ross
*Assistant Examiner* — Lawrence H Samuels
(74) *Attorney, Agent, or Firm* — XSensus LLP

(57) ABSTRACT

A wire electric discharge machine for machining a workpiece by causing a discharge between a wire electrode delivered from a wire bobbin and the workpiece. The wire electric discharge machine includes: a remaining length calculation unit that calculates a remaining length of the wire electrode based on electrode winding coefficients, bobbin draw-out radius correlation information, and a spool diameter of the wire bobbin. The electrode winding coefficients depend on a winding density of the wire electrode, an inner width of the wire bobbin, a wire diameter of the electrode wire, and a winding tension of the wire electrode. The bobbin draw-out radius correlation information is correlated with a bobbin draw-out radius that is a distance between a position at which the wire electrode wound around the wire bobbin is separated from the wire bobbin and a central axis of rotation of the wire bobbin.

17 Claims, 20 Drawing Sheets

(51) Int. Cl.
*B23H 7/08* (2006.01)
*B23H 11/00* (2006.01)

(56) References Cited

U.S. PATENT DOCUMENTS

| | | | | |
|---|---|---|---|---|
| 4,998,003 A * | 3/1991 | Kawanabe | ............... | B23H 7/10 |
| | | | | 219/69.12 |
| 5,216,217 A * | 6/1993 | Morishita | ............... | B23H 7/104 |
| | | | | 219/69.12 |
| 6,028,282 A * | 2/2000 | Toyonaga | ............... | B23H 7/104 |
| | | | | 219/69.12 |
| 6,326,577 B1 * | 12/2001 | Toyonaga | ............... | B23H 7/104 |
| | | | | 219/69.12 |
| 9,308,594 B2 * | 4/2016 | Onodera | ................ | B23H 7/104 |
| 9,446,464 B2 * | 9/2016 | Hara | ........................ | B23H 1/02 |
| 2014/0144885 A1 * | 5/2014 | Onodera | ................ | B23H 7/104 |
| | | | | 219/69.12 |
| 2015/0202701 A1 * | 7/2015 | Hara | ........................ | B23H 1/02 |
| | | | | 700/162 |
| 2016/0158863 A1 * | 6/2016 | Hiraga | .................. | B23H 11/00 |
| | | | | 219/69.15 |

FOREIGN PATENT DOCUMENTS

| | | |
|---|---|---|
| JP | 7-178622 A | 7/1995 |
| JP | 2000-343332 A | 12/2000 |
| JP | 2003-25155 A | 1/2003 |
| JP | 2010-179377 A | 8/2010 |

OTHER PUBLICATIONS

Notification of Reasons for Refusal received for Japanese Patent Application No. 2017-526000, dated Jul. 4, 2017, 6 pages including English Translation.
International Search Report dated Dec. 13, 2016 for PCT/JP2016/083760 filed on Nov. 15, 2016, 8 pages including English Translation.
Office Action dated Dec. 25, 2019 issued in corresponding Chinese Patent Application No. 201680090763.7, 12 pages with English Translation.

* cited by examiner

WIRE ELECTRIC DISCHARGE MACHINE

CROSS-REFERENCE TO RELATED APPLICATIONS

The present application is based on PCT filing PCT/JP2016/083760, filed Nov. 15, 2016, the entire contents of which are incorporated herein by reference.

FIELD

The present invention relates to a wire electric discharge machine for machining a workpiece by causing a discharge between a wire electrode delivered from a wire bobbin and the workpiece.

BACKGROUND

Conventionally, when machining a workpiece with a wire electric discharge machine, it is necessary to judge whether the scheduled machining can be performed with the remaining length of the wire electrode wound around the wire bobbin prior to the start of machining.

Patent Literature 1 discloses a technique of calculating the remaining length of a wire electrode by calculating the total length of the wire electrode and subtracting the length of the delivered wire electrode from the total length.

CITATION LIST

Patent Literature

Patent Literature 1: Japanese Patent Application Laid-open No. H7-178622

SUMMARY

Technical Problem

However, in the technique disclosed in Patent Literature 1 above, since the length of the delivered wire electrode is subtracted from the total wire length calculated at the time of full winding, the ratio of the margin of error in length to the remaining length of the wire electrode increases as the remaining wire electrode becomes shortened.

The present invention has been made in view of the above, and an object thereof is to obtain a wire electric discharge machine capable of accurately estimating the remaining length of a wire electrode.

Solution to Problem

In order to solve the above-mentioned problem and to achieve the object, the present invention provides a wire electric discharge machine for machining a workpiece by causing a discharge between a wire electrode delivered from a wire bobbin and the workpiece, and includes a remaining length calculation unit. The remaining length calculation unit calculates a remaining length of the wire electrode based on electrode winding coefficients, bobbin draw-out radius correlation information, and a spool diameter of the wire bobbin. The electrode winding coefficients depend on a winding density of the wire electrode, an inner width of the wire bobbin, a wire diameter of the electrode wire, and a winding tension of the wire electrode. The bobbin draw-out radius correlation information is correlated with a bobbin draw-out radius that is a distance between a position at which the wire electrode wound around the wire bobbin is separated from the wire bobbin and a central axis of rotation of the wire bobbin.

Advantageous Effects of Invention

The wire electric discharge machine according to the present invention can achieve the effect of accurately estimating the remaining length of a wire electrode.

DESCRIPTION OF EMBODIMENTS

Hereinafter, a wire electric discharge machine according to embodiments of the present invention will be described in detail based on the drawings. The present invention is not limited to the embodiments.

First Embodiment

Figure 1:
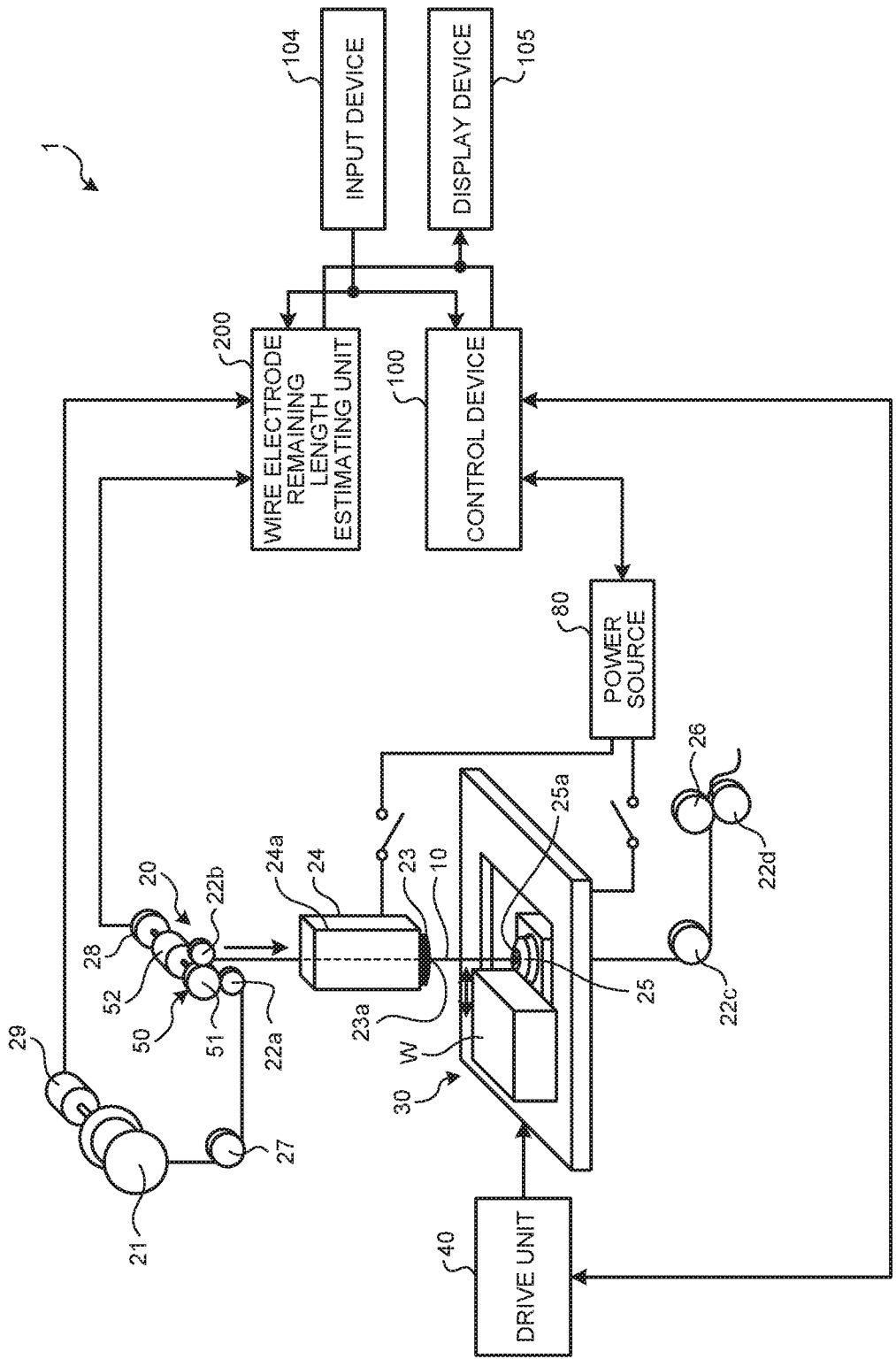
FIG. 1 is a diagram illustrating a configuration of a wire electric discharge machine according to a first embodiment of the present invention.

FIG. 1 is a diagram illustrating a configuration of a wire electric discharge machine according to the first embodiment of the present invention. The wire electric discharge machine 1 is a device for subjecting a workpiece W to wire electric discharge machining. As illustrated in FIG. 1, the wire electric discharge machine 1 includes a wire electrode 10 serving as a discharge electrode, a wire moving unit 20 that moves the wire electrode 10 along the longitudinal direction, a workpiece holding unit 30 that holds the workpiece W, and a drive unit 40 that moves the wire electrode 10 and the workpiece W relative to each other. The wire electric discharge machine 1 also includes a tension applying unit 50 that applies tension to the wire electrode 10. The wire electric discharge machine 1 further includes a control device 100 that controls the adjustment of the relative position between the wire electrode 10 and the workpiece W by the drive unit 40.

The control device 100 is a numerical control device that executes a numerical control program to generate machining conditions, and outputs machining conditions to each part of the wire electric discharge machine 1 to control the operation of each part of the wire electric discharge machine 1. The control device 100 also executes a numerical control program to position the workpiece W with respect to the wire electrode 10. The control device 100 also causes a discharge between the wire electrode 10 and the workpiece W to subject the workpiece W to electric discharge machining.

Information necessary for generating machining conditions is input to the control device 100 from an input device 104. The input device 104 includes a touch panel, a keyboard, a mouse, a trackball, or a combination thereof. The control device 100 is also connected to a display device 105 that displays information. The display device 105 can be, but is not limited to, a liquid crystal display device.

A machining voltage is applied to the wire electrode 10 to cause a discharge between the wire electrode 10 and the workpiece W. The wire electrode 10 is made of a metal having conductivity, and has a circular cross-section and an elongated shape.

The wire moving unit 20 includes a wire bobbin 21, a pulley 27, upper wire feed rollers 22a and 22b, lower wire feed rollers 22c and 22d, a machining head 24, a lower nozzle 25, and a collecting rollers 26. The wire bobbin 21 is a bobbin-shaped member serving as a core around which the wire electrode 10 is wound. The wire electrode 10 delivered from the wire bobbin 21 is wound around the pulley 27. The machining head 24 includes an upper nozzle 23 that delivers the wire electrode 10 toward the workpiece W. The lower nozzle 25 passes the wire electrode 10. The collecting roller 26 collects the wire electrode 10. The upper wire feed rollers 22a and 22b and the lower wire feed rollers 22c and 22d are supported so as to be rotatable about the shaft center. The upper wire feed rollers 22a and 22b are provided between the wire bobbin 21 and the machining head 24. The wire electrode 10 is wound around the upper wire feed rollers 22a and 22b to be guided from the wire bobbin 21 to the machining head 24. The lower wire feed rollers 22c and 22d are provided between the lower nozzle 25 and the collecting roller 26. The wire electrode 10 is wound around the lower wire feed rollers 22c and 22d to be guided from the lower nozzle 25 to the collecting roller 26. The upper wire feed rollers 22a and 22b and the lower wire feed rollers 22c and 22d rotate as the wire electrode 10 travels. The wire bobbin 21 is equipped with a rotation angle detector 29 that detects the rotation angle of the wire bobbin 21.

The machining head 24 includes a head body 24a through which the wire electrode 10 passes and the upper nozzle 23 attached to the lower surface of the head body 24a which faces the workpiece W. The upper nozzle 23 includes a guide hole 23a through which the wire electrode 10 passes.

The lower nozzle 25 is arranged below the upper nozzle 23 of the machining head 24. The lower nozzle 25 includes a guide hole 25a through which the wire electrode 10 passes. The wire electrode 10 passes through the guide holes 23a and 25a in the upper nozzle 23 and the lower nozzle 25, respectively, whereby the wire electrode 10 is linearly supported between the upper nozzle 23 and the lower nozzle 25. In the first embodiment, the upper nozzle 23 and the lower nozzle 25 face each other with a space in the vertical direction, and support the wire electrode 10 between the upper nozzle 23 and the lower nozzle 25 in parallel with the vertical direction.

The collecting roller 26 is arranged between the lower wire feed roller 22c and the lower wire feed roller 22d. The collecting roller 26 sandwiches the wire electrode 10 between the lower wire feed roller 22c and the lower wire feed roller 22d and is rotated by a motor (not illustrated). When the workpiece W is subjected to electric discharge machining, the collecting roller 26 is rotationally driven by the motor so as to collect the wire electrode 10 passed through the guide hole 23a in the upper nozzle 23 and the guide hole 25a in the lower nozzle 25. Changing the rotation speed of the motor enables the collecting roller 26 to change the movement speed of the wire electrode 10.

The workpiece holding unit 30 is made of a metal having conductivity, and has a quadrangular frame shape in a plan view. The workpiece holding unit 30 is formed to have a flat surface and is arranged in parallel with the horizontal direction. The workpiece holding unit 30 passes therethrough the wire electrode 10 between the upper nozzle 23 and the lower nozzle 25.

Between the wire electrode 10 and the workpiece W, a machining voltage is applied from a power source 80. The power source 80 is electrically connected to the wire electrode 10 and is coupled to the workpiece W via the workpiece holding unit 30. The machining voltage applied by the power source 80 destroys the insulation between the wire electrode 10 between the upper nozzle 23 and the lower nozzle 25 and the workpiece W to cause a discharge, which removes a part of the workpiece W.

The tension applying unit 50 applies tension to the wire electrode 10 when a machining voltage is applied to the wire electrode 10 for electric discharge machining of the workpiece W. The tension applying unit 50 includes a tension applying roller 51 and a motor 52 capable of rotating the tension applying roller 51. The tension applying roller 51 is provided between the wire bobbin 21 and the machining head 24, and sandwiches the wire electrode 10 between the upper wire feed rollers 22a and 22b. The motor 52 rotates the tension applying roller 51 in the direction in which the wire electrode 10 is wound around the wire bobbin 21. The driving torque of the motor 52 is weaker than the driving torque of the motor that rotates the collecting roller 26. The tension applying unit 50 applies, to the tension applying roller 51, a driving torque weaker than the driving torque of the motor that rotates the collecting roller 26 when the workpiece W is subjected to electric discharge machining, thereby applying tension to the wire electrode 10 along the longitudinal direction of the wire electrode 10 between the upper nozzle 23 and the lower nozzle 25. The tension applying roller 51 is equipped with a rotation angle detector 28 that detects the rotation angle of the tension applying roller 51.

Each of the rotation angle detectors 28 and 29 can be an encoder that digitally detects the rotation angle or a tachometer that detects the rotation angle in an analog manner.

The wire electric discharge machine 1 also includes a wire electrode remaining length estimating unit 200 that performs the process of estimating the remaining length of the wire electrode 10 remaining on the wire bobbin 21. The wire electrode remaining length estimating unit 200 is connected to the input device 104 and the display device 105. Information necessary for executing the process of estimating the remaining length of the wire electrode 10 is input to the wire electrode remaining length estimating unit 200 from the input device 104.

Figure 2:
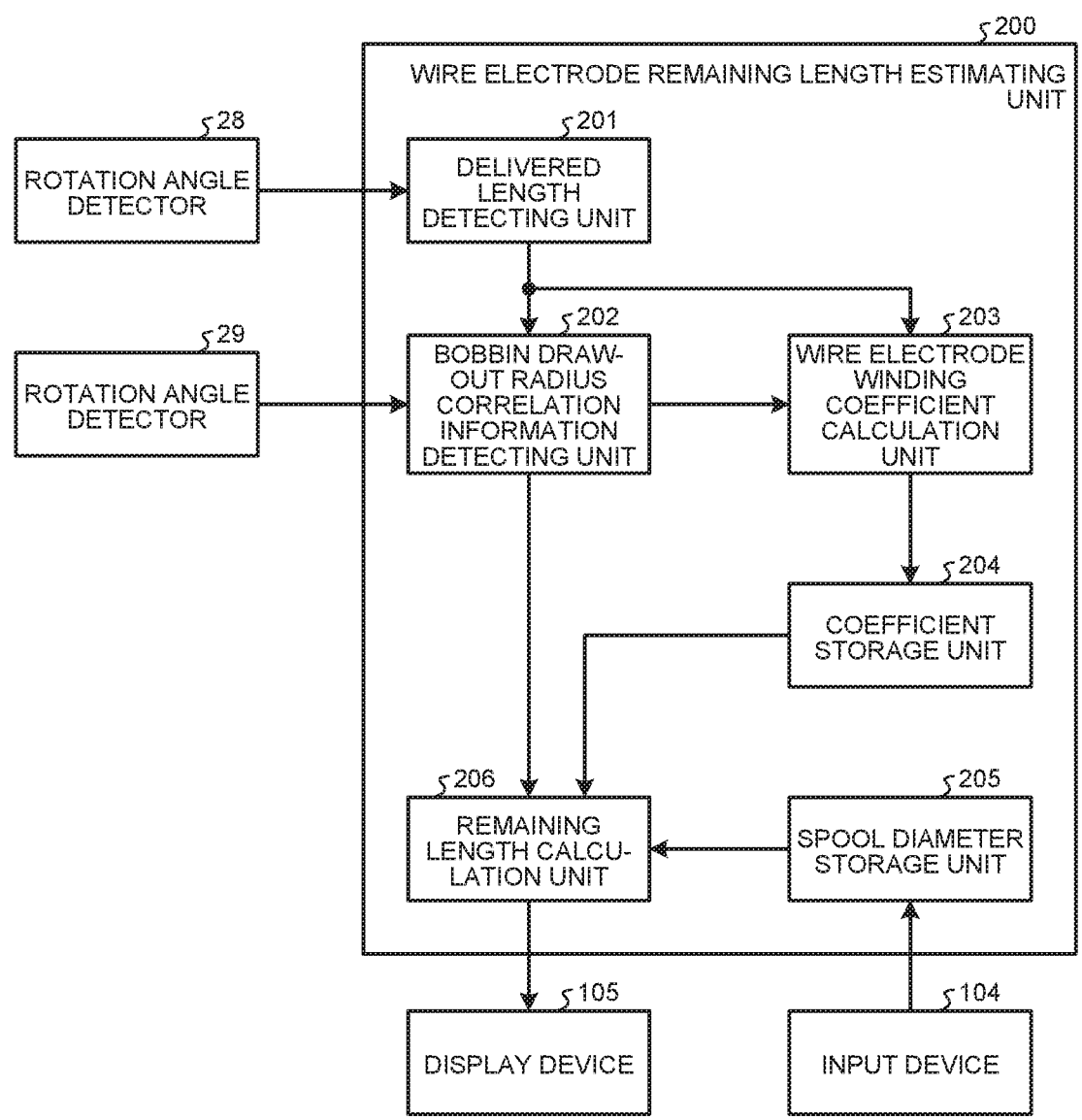
FIG. 2 is a functional block diagram of a wire electrode remaining length estimating unit of the wire electric discharge machine according to the first embodiment.

FIG. 2 is a functional block diagram of the wire electrode remaining length estimating unit of the wire electric discharge machine according to the first embodiment. The wire electrode remaining length estimating unit 200 includes a delivered length detecting unit 201, a bobbin draw-out radius correlation information detecting unit 202, a wire electrode winding coefficient calculation unit 203, a coefficient storage unit 204, a spool diameter storage unit 205, and a remaining length calculation unit 206. The delivered length detecting unit 201 detects a delivered length that is the length of the wire electrode 10 delivered from the wire bobbin 21 during a set time. The bobbin draw-out radius correlation information detecting unit 202 detects bobbin draw-out radius correlation information correlated with a bobbin draw-out radius that is the distance between the position at which the wire electrode 10 wound around and delivered from the wire bobbin 21 is separated from the wire bobbin 21 and the central axis of rotation of the wire bobbin 21. The wire electrode winding coefficient calculation unit 203 calculates wire electrode winding coefficients based on the delivered length of the wire electrode 10 and the transition of bobbin draw-out radius correlation information corresponding to the delivered length of the wire electrode 10. The wire electrode winding coefficients depend on the winding density of the wire electrode 10 and the inner width of the wire bobbin 21. The coefficient storage unit 204 stores the wire electrode winding coefficients calculated by the wire electrode winding coefficient calculation unit 203. The spool diameter storage unit 205 stores the value of a spool diameter through the user's operation with the input device 104. The spool diameter is the diameter of the wire bobbin 21 around which the wire electrode 10 is not wound. The remaining length calculation unit 206 calculates the remaining length of the wire electrode 10 wound around the wire bobbin 21 based on the bobbin draw-out radius correlation information, the wire electrode winding coefficients, and the spool diameter. Since the winding density of the wire electrode 10 depends on the wire diameter and winding tension of the wire electrode 10, the wire electrode winding coefficients depend on the inner width of the wire bobbin 21, the wire diameter of the wire electrode 10, and the winding tension of the wire electrode 10. In the spool diameter storage unit 205, the spool diameter is stored through the operation with the input device 104. Note that the spool diameter may be acquired from a device outside the wire electric discharge machine 1 and stored in the spool diameter storage unit 205.

The rotation angle of the tension applying roller 51 is input from the rotation angle detector 28 to the delivered length detecting unit 201. Since the diameter of the tension applying roller 51 is a known value, the delivered length detecting unit 201 can calculate the delivered length of the wire electrode 10 using the rotation angle of the tension applying roller 51 and the diameter and circumference ratio of the tension applying roller 51. Note that the delivered length of the wire electrode 10 can be detected as long as the rotation angle of a member whose diameter or radius is known and which rotates as the wire electrode 10 travels can be measured. Therefore, the rotation angle detector 28 may be provided on the pulley 27, and the delivered length of the wire electrode 10 may be calculated based on the result of detection of the rotation angle of the pulley 27.

The rotation angle of the wire bobbin 21 is input from the rotation angle detector 29 to the bobbin draw-out radius correlation information detecting unit 202. In the following description, the bobbin draw-out radius correlation information detected by the bobbin draw-out radius correlation information detecting unit 202 is a bobbin draw-out diameter that is double the bobbin draw-out radius, i.e., the distance between the position at which the wire electrode 10 wound around and delivered from the wire bobbin 21 is separated from the wire bobbin 21 and the central axis of rotation of the wire bobbin 21.

Therefore, the wire electrode winding coefficient calculation unit 203 calculates the wire electrode winding coefficients based on the delivered length of the wire electrode 10 and the transition of bobbin draw-out diameter corresponding to the delivered length of the wire electrode 10. Note that the bobbin draw-out radius correlation information detecting unit 202 can calculate the bobbin draw-out diameter by dividing the product of the diameter of the pulley 27 and the rotation angle of the pulley 27 by the rotation angle of the wire bobbin 21. The remaining length calculation unit 206 calculates the remaining length of the wire electrode 10 wound around the wire bobbin 21 based on the bobbin draw-out diameter, the wire electrode winding coefficients, and the spool diameter.

The bobbin draw-out radius correlation information detecting unit 202 also detects the rotation speed of the wire bobbin 21 based on the rotation angle of the wire bobbin 21 input from the rotation angle detector 29. Therefore, the bobbin draw-out radius correlation information detecting unit 202 constitutes a unit for detecting the rotation speed of the wire bobbin 21 together with the rotation angle detector 29. Thus, the bobbin draw-out radius correlation information detecting unit 202 detects the rotation speed of the wire bobbin 21, and detects the bobbin draw-out diameter based on the delivered length and the rotation speed.

Note that the bobbin draw-out radius correlation information detected by the bobbin draw-out radius correlation information detecting unit 202 is not limited to the bobbin draw-out diameter. The bobbin draw-out radius correlation information detected by the bobbin draw-out radius correlation information detecting unit 202 may be the ratio between the rotation speed of the pulley 27 and the rotation speed of the wire bobbin 21. Alternatively, the bobbin draw-out radius correlation information detected by the bobbin draw-out radius correlation information detecting unit 202 may be the square of the bobbin draw-out diameter.

Figure 3:
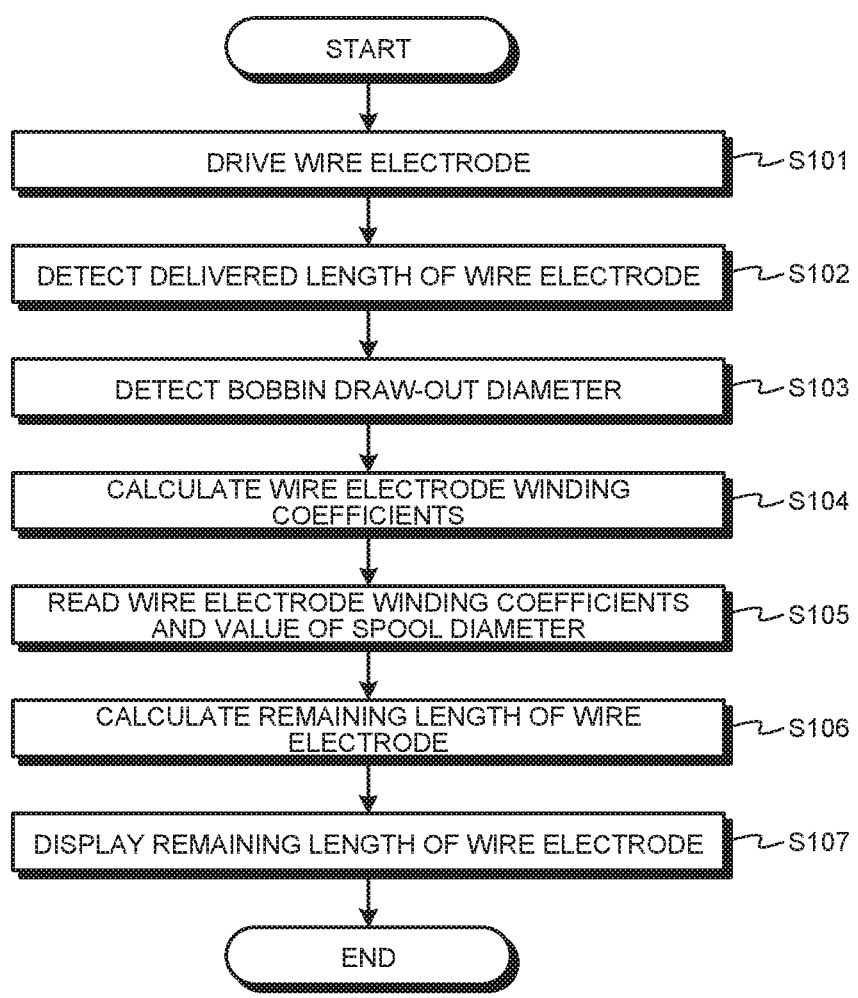
FIG. 3 is a flowchart illustrating the procedure for the operation of the wire electrode remaining length estimating unit of the wire electric discharge machine according to the first embodiment.

The operation of the wire electric discharge machine 1 for estimating the remaining length of the wire electrode 10 according to the first embodiment will be described. FIG. 3 is a flowchart illustrating the procedure for the operation of the wire electrode remaining length estimating unit of the wire electric discharge machine according to the first embodiment. In step S101, the control device 100 drives the wire electrode 10 with an unknown remaining length on the wire bobbin 21.

In step S102, based on the rotation angle of the tension applying roller 51 input from the rotation angle detector 28 and the diameter of the tension applying roller 51 which is a known value, the delivered length detecting unit 201 detects the delivered length of the wire electrode 10.

In step S103, the bobbin draw-out radius correlation information detecting unit 202 detects the bobbin draw-out diameter based on the rotation angle of the wire bobbin 21 input from the rotation angle detector 29, the rotation angle of the tension applying roller 51 input from the rotation angle detector 28, and the diameter of the tension applying roller 51 which is a known value.

In step S104, the wire electrode winding coefficient calculation unit 203 calculates the wire electrode winding coefficients based on the delivered length of the wire electrode 10 and the transition of bobbin draw-out diameter corresponding to the delivered length of the wire electrode 10. The delivered length L of the wire electrode is proportional to the volume of the wire electrode 10 delivered, and the volume of the wire electrode 10 wound around the wire bobbin 21 is a quadratic function of the bobbin draw-out diameter d. Therefore, the delivered length L can be expressed as $L=k_1 \times d+k_2 \times d^2+k_3$ using the bobbin draw-out diameter d and the wire electrode winding coefficients $k_1$, $k_2$, and $k_3$. Thus, the wire electrode winding coefficients $k_1$, $k_2$, and $k_3$ can be calculated through a multivariate analysis of the delivered length L of the wire electrode 10 and the bobbin draw-out diameter d. Since known methods such as the method of least squares can be applied to multivariate analysis, the description of the analysis method will be omitted here. The wire electrode winding coefficient calculation unit 203 stores the calculated wire electrode winding coefficients in the coefficient storage unit 204.

In step S105, the remaining length calculation unit 206 reads the wire electrode winding coefficients stored in the coefficient storage unit 204 and the value of the spool diameter stored in the spool diameter storage unit 205.

In step S106, the remaining length calculation unit 206 calculates the remaining length $\Delta L$ of the wire electrode 10 based on the bobbin draw-out diameter d, the wire electrode winding coefficients $k_1$, $k_2$, and $k_3$, and the spool diameter f using $\Delta L=(k_1 \times d+k_2 \times d^2+k_3)=(k_1 \times f+k \times f^2+k_3)=k_1(d-f)+k_2(d^2-f^2)$. This is because the remaining length $\Delta L$ of the wire electrode 10 is the difference between the delivered length of the wire electrode corresponding to the current bobbin draw-out diameter d and the delivered length of the wire electrode corresponding to the bobbin draw-out diameter obtained just before the wire electrode is used up, that is, when the bobbin draw-out diameter d coincides with the spool diameter f. Here, $k_1$ is a dimensionless coefficient, $k_2$ is a coefficient having a reciprocal length dimension, and $k_3$ is a coefficient having a length dimension. Since $k_1(d-f) \ll k_2(d^2-f^2)$ is generally satisfied, it is also possible to approximate the remaining length $\Delta L$ of the wire electrode 10 to $\Delta L=k_2(d^2-f^2)$.

In step S107, the remaining length of the wire electrode 10 is displayed on the display device 105. The user of the wire electric discharge machine 1 can read the remaining length of the wire electrode 10 displayed on the display device 105 to judge whether the scheduled machining can be performed with the wire electrode 10 remaining on the wire bobbin 21.

In the above description, the relational expression between the delivered length of the wire electrode 10 and the bobbin draw-out diameter is derived. Alternatively, the relational expression between the delivered length of the wire electrode 10 and a value correlated with the bobbin draw-out radius, e.g., the rotational frequency of the wire bobbin 21 or the ratio between the rotation speed of the wire bobbin 21 and the rotation speed of the pulley 27, may be derived.

The wire electric discharge machine 1 according to the first embodiment calculates the remaining length of the wire electrode 10 based on the bobbin draw-out diameter, the wire electrode winding coefficients, and the spool diameter. Therefore, the margin of error in the remaining length of the wire electrode 10 is in a constant ratio to the remaining length of the wire electrode 10. Now consider an example in which the wire electrode 10 with a full winding remaining length, that is, a total length, of 20 km is wound around the wire bobbin 21, and the calculation of the remaining length of the wire electrode 10 has a margin of error of 5%. In the case of subtracting the length of the wire electrode 10 delivered from the total length of the wire electrode 10 calculated at the time of full winding, the total length of the wire electrode 10 calculated at the time of full winding has a margin of error of 20 km×5%=1 km, and the margin of error does not change until the wire electrode 10 is used up. That is, even when the remaining length of the wire electrode 10 is 1 km, the margin of error remains 1 km. On the other hand, in the wire electric discharge machine 1 according to the first embodiment, the margin of error of the remaining length of the wire electrode 10 at the time of full winding is 1 km as in the case of subtracting the length of the wire electrode 10 delivered from the total length of the wire electrode 10 calculated at the time of full winding. However, in the wire electric discharge machine 1 according to the first embodiment, the margin of error becomes small as the wire electrode 10 is used, and the margin of error of the remaining length of the wire electrode 10 calculated when the remaining length of the wire electrode 10 is 1 km is 1 km×5%=50 m. As described above, in the wire electric discharge machine 1 according to the first embodiment, the margin of error of the remaining length of the wire electrode 10 becomes small as the remaining length of the wire electrode 10 decreases, and the remaining length of the wire electrode 10 can be accurately estimated. Since the remaining length of the wire electrode 10 can be calculated even with the wire bobbin 21 that has already been used, the remaining length of the wire electrode 10 can be estimated even after the wire bobbin 21 is replaced or the disconnected wire electrode 10 is reconnected.

In the above description, the wire electrode winding coefficients are calculated by the wire electrode remaining length estimating unit 200 itself. Alternatively, the wire electrode winding coefficients may be input to the wire electrode remaining length estimating unit 200 from the outside of the wire electric discharge machine 1. For example, the wire electrode winding coefficients estimated by another wire electric discharge machine may be input to the wire electrode remaining length estimating unit 200 and stored in the coefficient storage unit 204.

For calculating the remaining length of the wire electrode 10 in the wire electric discharge machine 1 according to the first embodiment, the user need not adjust the wire electrode winding coefficients.

Second Embodiment

Figure 4:
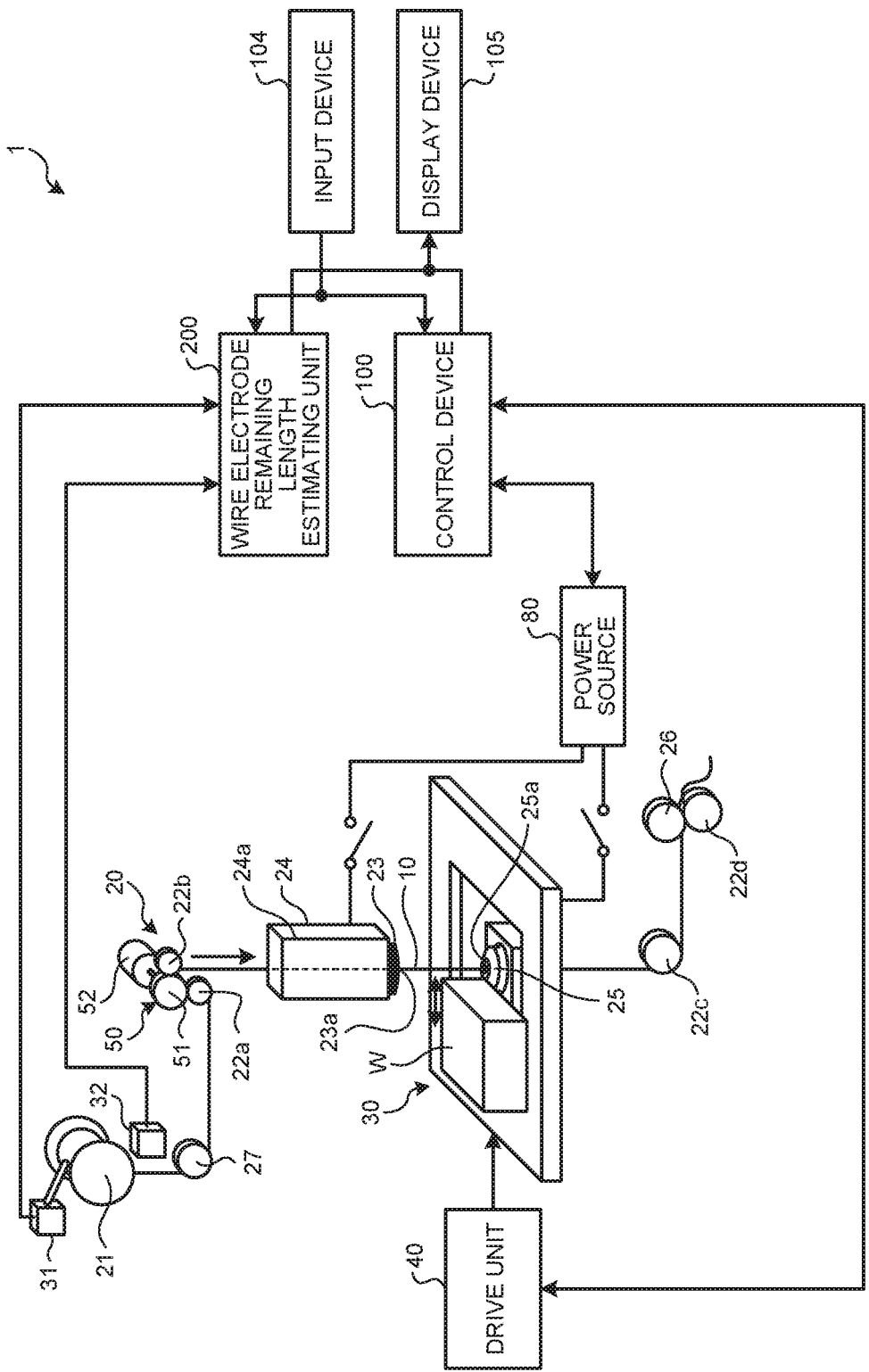
FIG. 4 is a diagram illustrating a configuration of a wire electric discharge machine according to a second embodiment of the present invention.
Figure 5:
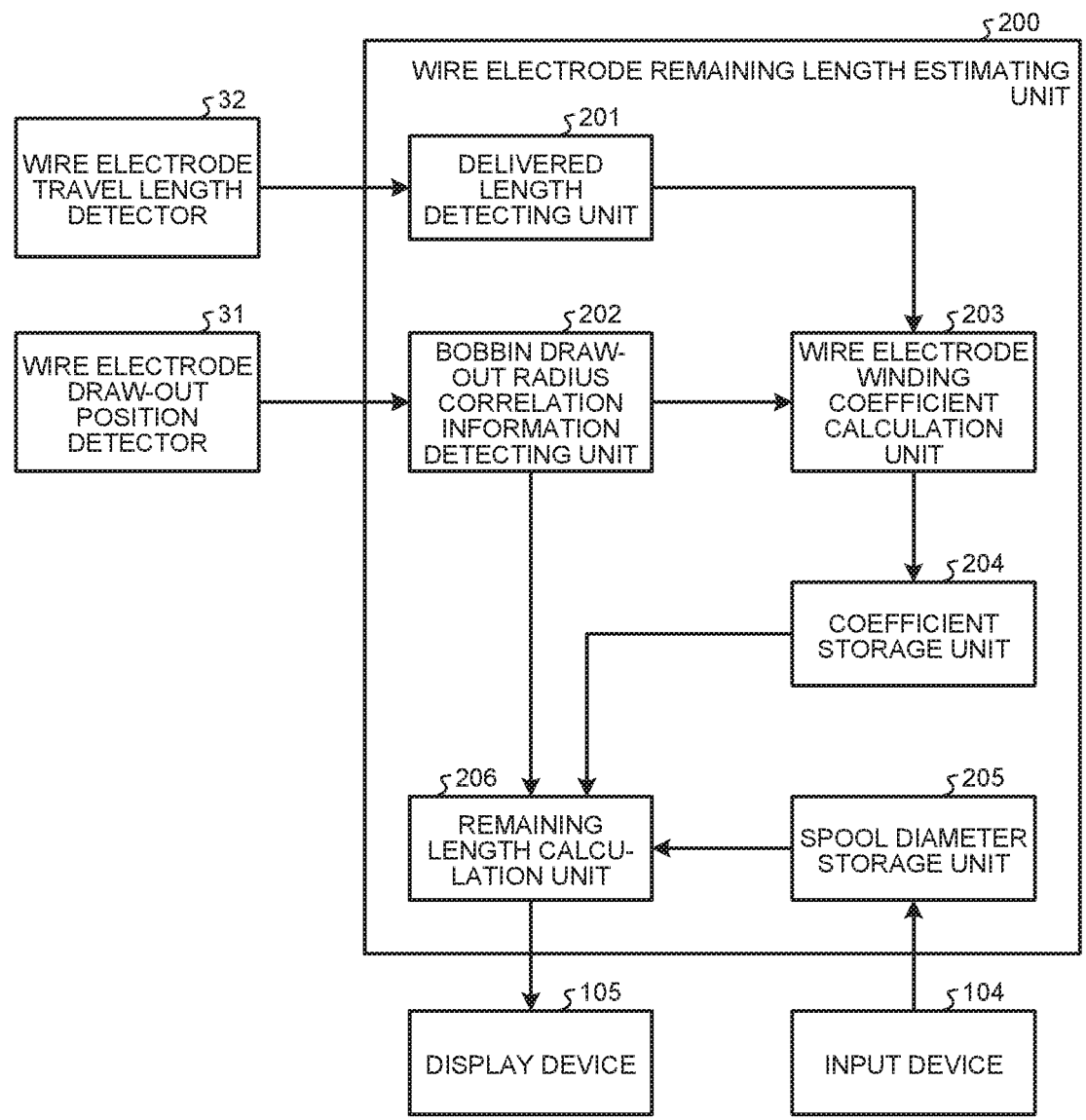
FIG. 5 is a functional block diagram of a wire electrode remaining length estimating unit of the wire electric discharge machine according to the second embodiment.

FIG. 4 is a diagram illustrating a configuration of a wire electric discharge machine according to the second embodiment of the present invention. FIG. 5 is a functional block diagram of a wire electrode remaining length estimating unit of the wire electric discharge machine according to the second embodiment. The wire electric discharge machine 1 according to the second embodiment is different from the wire electric discharge machine 1 according to the first embodiment in that it includes a wire electrode draw-out position detector 31 and a wire electrode travel length detector 32 but does not include the rotation angle detectors 28 and 29. The other parts are similar to the parts of the wire electric discharge machine 1 according to the first embodiment.

The wire electrode draw-out position detector 31 detects, in a contact or non-contact manner, the position at which the wire electrode 10 wound around and delivered from the wire bobbin 21 is separated from the wire bobbin 21.

The wire electrode travel length detector 32 detects the travel length of the wire electrode 10 in a non-contact manner. Specifically, the travel length of the wire electrode 10 is detected by irradiating the wire electrode 10 with light such as laser light and measuring reflection from the slightly uneven surface of the wire electrode 10 with a camera module.

The delivered length detecting unit 201 regards, as the delivered length of the wire electrode 10, the travel length of the wire electrode 10 input from the wire electrode travel length detector 32, and outputs it to the wire electrode winding coefficient calculation unit 203.

The bobbin draw-out radius correlation information detecting unit 202 calculates the bobbin draw-out diameter based on the position at which the wire electrode 10 wound around and delivered from the wire bobbin 21 is separated from the wire bobbin 21, which is input from the wire electrode draw-out position detector 31, and on the known position of the central axis of rotation of the wire bobbin 21. The bobbin draw-out radius correlation information detecting unit 202 then outputs the bobbin draw-out diameter to the wire electrode winding coefficient calculation unit 203 and the remaining length calculation unit 206.

The operation of the wire electric discharge machine 1 for estimating the remaining length of the wire electrode 10 according to the second embodiment is similar to the operation of the wire electric discharge machine 1 according to the first embodiment except that the travel length of the wire electrode 10 detected by the wire electrode travel length detector 32 is regarded as the delivered amount of the wire electrode 10 and that the bobbin draw-out diameter is calculated based on the position at which the wire electrode 10 wound around and delivered from the wire bobbin 21 is separated from the wire bobbin 21, which is detected by the wire electrode draw-out position detector 31.

In the same way as the wire electric discharge machine 1 according to the first embodiment, the wire electric discharge machine 1 according to the second embodiment calculates the remaining length of the wire electrode 10 based on the bobbin draw-out diameter, the wire electrode winding coefficients, and the spool diameter. Therefore, the remaining length of the wire electrode 10 can be accurately calculated. Since the remaining length of the wire electrode 10 can be calculated even with the wire bobbin 21 that has already been used, the remaining length of the wire electrode 10 can be estimated even after the wire bobbin 21 is replaced or the disconnected wire electrode 10 is reconnected.

Third Embodiment

Figure 6:
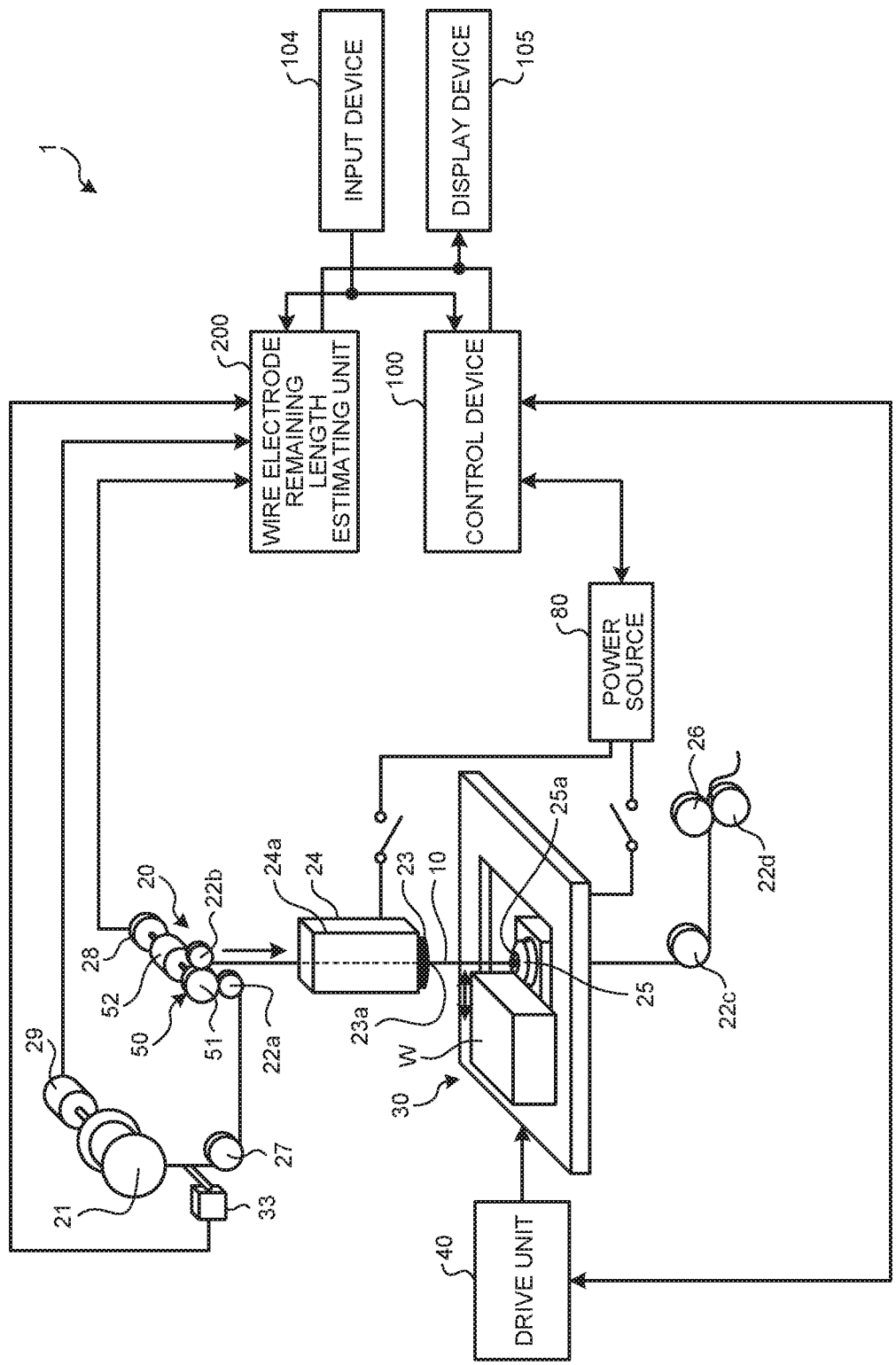
FIG. 6 is a diagram illustrating a configuration of a wire electric discharge machine according to a third embodiment of the present invention.
Figure 7:
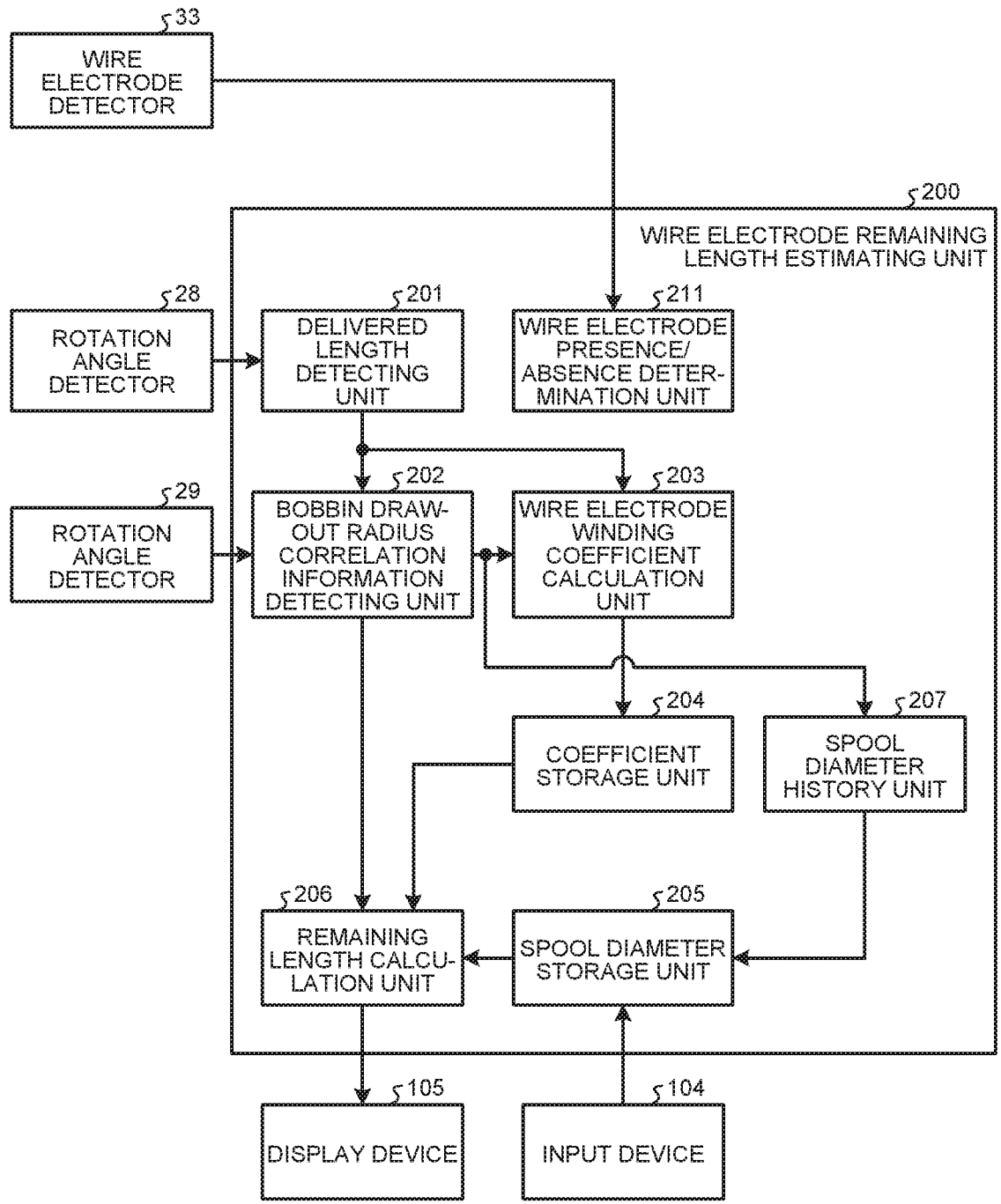
FIG. 7 is a functional block diagram of a wire electrode remaining length estimating unit of the wire electric discharge machine according to the third embodiment.

FIG. 6 is a diagram illustrating a configuration of a wire electric discharge machine according to the third embodiment of the present invention. The wire electric discharge machine 1 according to the third embodiment includes a wire electrode detector 33 that detects that the wire electrode 10 on the wire bobbin 21 has run out. The wire electrode detector 33 can be a device including a probe that detects contact with the wire electrode 10 or a device that irradiates the wire electrode 10 with light and optically detects the wire electrode 10 based on the detected intensity of reflected light. Any type of device may be employed as long as it can detect that the wire electrode 10 on the wire bobbin 21 has run out. FIG. 7 is a functional block diagram of a wire electrode remaining length estimating unit of the wire electric discharge machine according to the third embodiment. The wire electrode remaining length estimating unit 200 of the wire electric discharge machine 1 according to the third embodiment includes a wire electrode presence/absence determination unit 211 and a spool diameter history unit 207. The wire electrode presence/absence determination unit 211 determines whether the wire electrode 10 remains on the wire bobbin 21 based on the detection result of the wire electrode detector 33. The spool diameter history unit 207 regards the bobbin draw-out diameter as the spool diameter once the wire electrode presence/absence determination unit 211 determines that the wire electrode 10 on the wire bobbin 21 has run out, and stores the bobbin draw-out diameter in the spool diameter storage unit 205. Note that the bobbin draw-out diameter obtained when the remaining length of the wire electrode 10 becomes zero coincides with the spool diameter.

Figure 8:
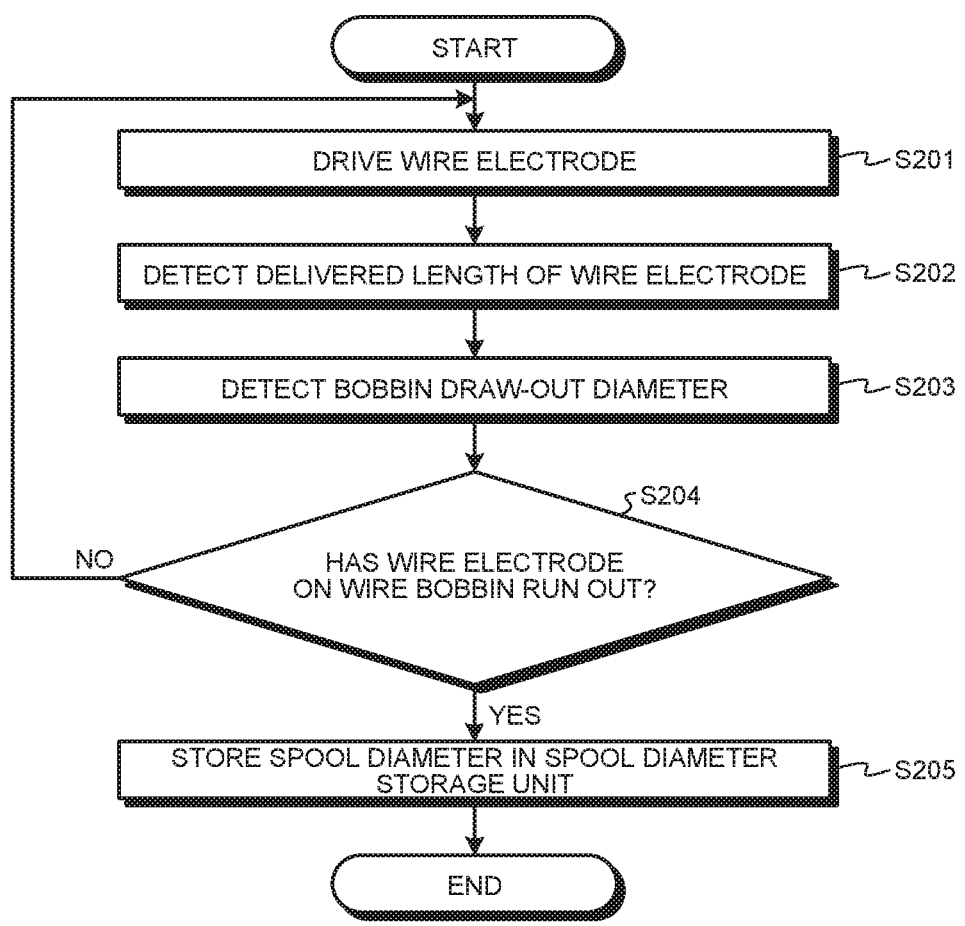
FIG. 8 is a flowchart illustrating the procedure for the operation of the wire electrode remaining length estimating unit of the wire electric discharge machine according to the third embodiment.
Figure 9:
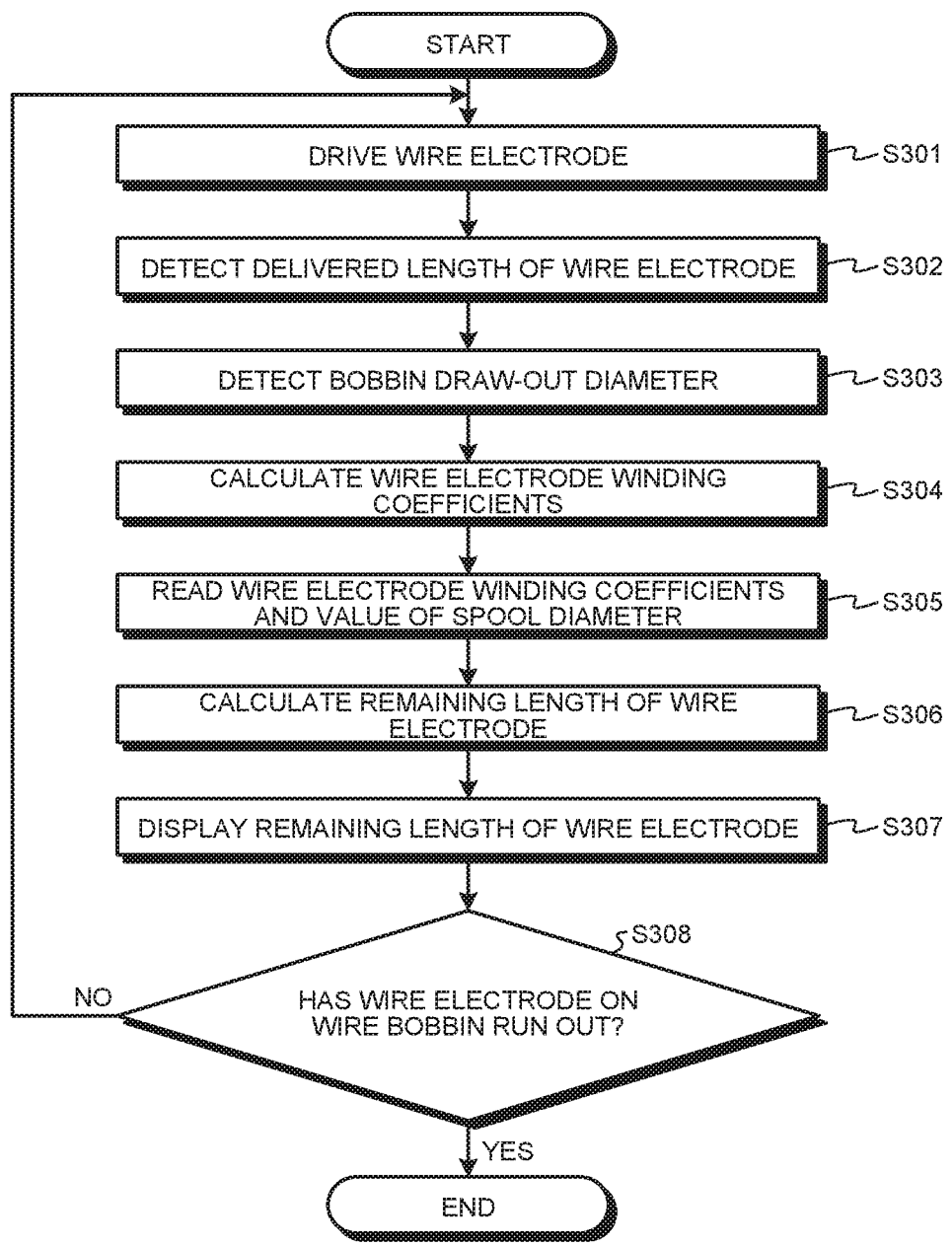
FIG. 9 is a flowchart illustrating the procedure for the operation of the wire electrode remaining length estimating unit of the wire electric discharge machine according to the third embodiment.

FIGS. 8 and 9 are flowcharts each illustrating the procedure for the operation of the wire electrode remaining length estimating unit of the wire electric discharge machine according to the third embodiment. FIG. 8 is the operation for the case where the spool diameter has not been stored in the spool diameter storage unit 205, and FIG. 9 is the operation for the case where the spool diameter has been stored in the spool diameter storage unit 205. The processes of steps S201 to S203 are similar to the processes of steps S101 to S103 in FIG. 3. In step S204, based on the input from the wire electrode detector 33, the wire electrode presence/absence determination unit 211 determines whether the wire electrode 10 on the wire bobbin 21 has run out. If the wire electrode presence/absence determination unit 211 determines that the wire electrode 10 on the wire bobbin 21 has run out, Yes is selected in step S204, and the operation proceeds to step S205. If the wire electrode presence/absence determination unit 211 does not determine that the wire electrode 10 on the wire bobbin 21 has run out, No is selected in step S204, and the operation returns to step S201. In step S205, the spool diameter history unit 207 regards the bobbin draw-out diameter detected in step S203 as the spool diameter and stores it in the spool diameter storage unit 205.

The processes of steps S301 to S307 are similar to the processes of steps S101 to S107 in FIG. 3. In step S308, the wire electrode presence/absence determination unit 211 determines whether the wire electrode 10 on the wire bobbin 21 has run out based on the input from the wire electrode detector 33. If the wire electrode presence/absence determination unit 211 determines that the wire electrode 10 on the wire bobbin 21 has run out, Yes is selected in step S308, and the operation is terminated. If the wire electrode presence/absence determination unit 211 does not determine that the wire electrode 10 on the wire bobbin 21 has run out, No is selected in step S308, and the operation proceeds to step S301.

The wire electric discharge machine 1 according to the third embodiment can automatically store, in the spool diameter storage unit 205, the spool diameter of the wire bobbin 21 previously attached. Therefore, the user need not refer to the specification table of the wire bobbin 21 to manually store the spool diameter in the spool diameter storage unit 205, which can prevent errors in the calculation of the remaining length of the wire electrode 10 due to a mistake in inputting the spool diameter.

In the above explanation, the wire electrode detector 33 is provided to detect that the wire electrode 10 on the wire bobbin 21 has run out. Alternatively, the rotation angle detector 28 and the rotation angle detector 29 may be used to detect that the wire electrode 10 on the wire bobbin 21 has run out based on the degree of coordination between them. Therefore, the wire electric discharge machine 1 according to the first embodiment or the second embodiment without the wire electrode detector 33 can also execute the operations illustrated in the flowcharts of FIGS. 8 and 9.

Fourth Embodiment

Figure 10:
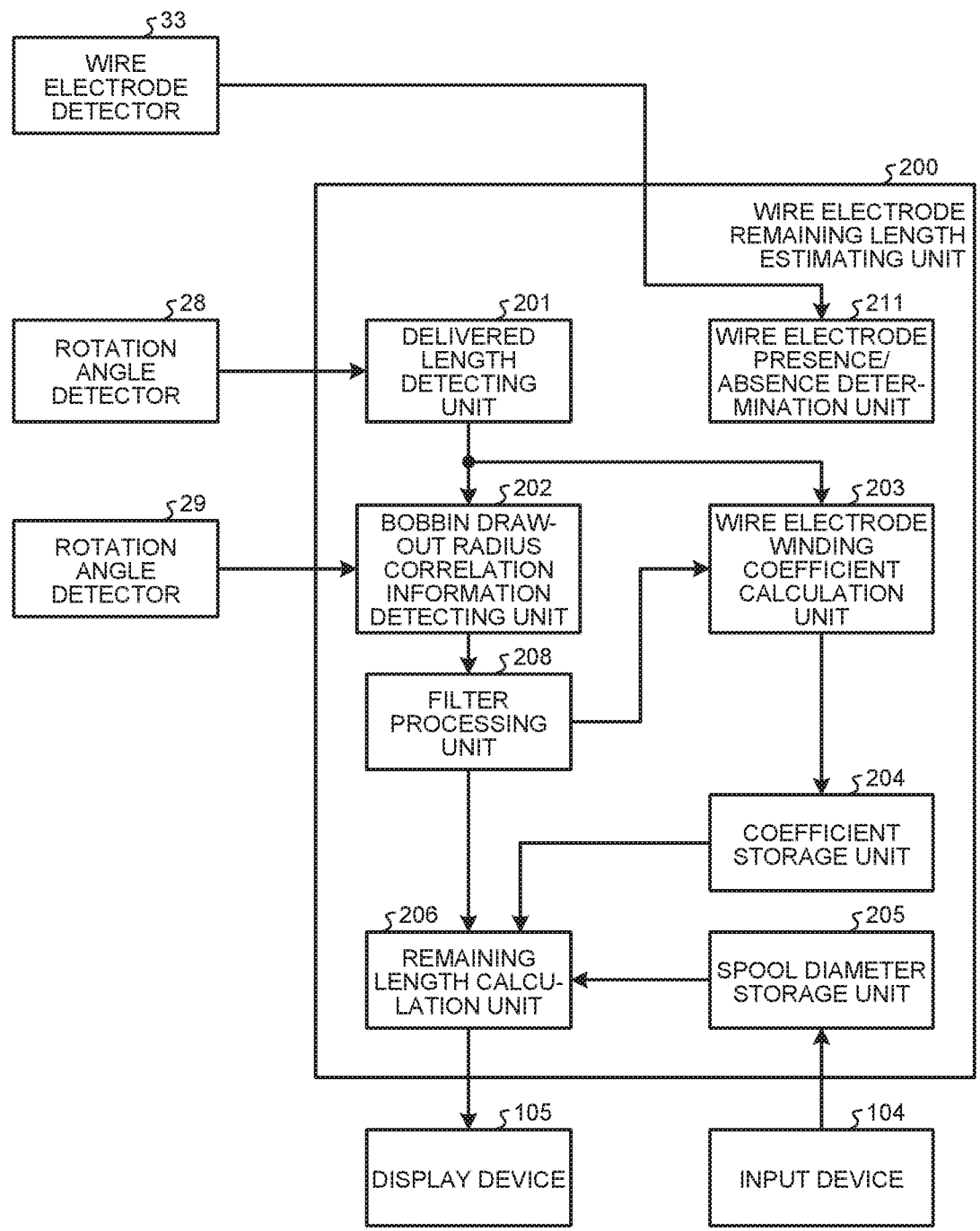
FIG. 10 is a functional block diagram of a wire electrode remaining length estimating unit of a wire electric discharge machine according to a fourth embodiment of the present invention.

The configuration of the wire electric discharge machine 1 according to the fourth embodiment of the present invention is similar to the configuration of the wire electric discharge machine 1 according to the third embodiment, and includes the wire electrode detector 33. FIG. 10 is a functional block diagram of a wire electrode remaining length estimating unit of the wire electric discharge machine according to the fourth embodiment of the present invention. The wire electric discharge machine 1 according to the fourth embodiment includes a filter processing unit 208 that removes the component of fluctuations in bobbin draw-out diameter generated at a frequency higher than the rotation cycle of the wire bobbin 21. In the wire electrode remaining length estimating unit 200 of the wire electric discharge machine 1 according to the fourth embodiment, the detection result of the wire electrode detector 33 is not input to a specific functional unit, but input to the wire electrode remaining length estimating unit 200 itself.

Figure 11:
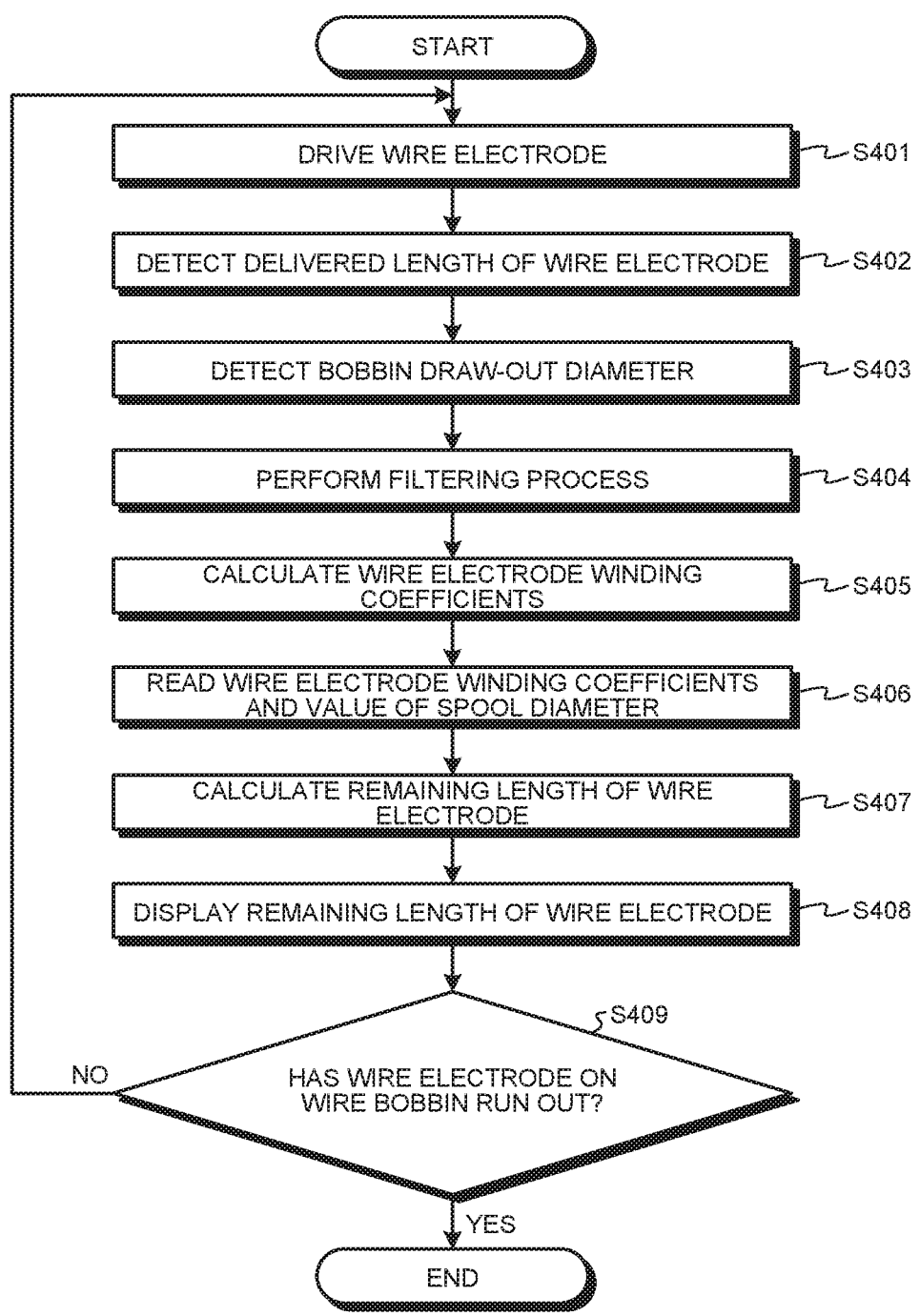
FIG. 11 is a flowchart illustrating the procedure for the operation of the wire electrode remaining length estimating unit of the wire electric discharge machine according to the fourth embodiment.

FIG. 11 is a flowchart illustrating the procedure for the operation of the wire electrode remaining length estimating unit of the wire electric discharge machine according to the fourth embodiment. The processes of steps S401 to S403 are similar to the processes of steps S101 to S103 in FIG. 3. In step S404, the filter processing unit 208 performs a filtering process to remove the component of fluctuations in bobbin draw-out diameter generated at a frequency higher than the rotation cycle of the wire bobbin 21. The processes of steps S405 to S408 are similar to the processes of steps S104 to S107 in FIG. 3. In step S409, the wire electrode presence/absence determination unit 211 determines whether the wire electrode 10 on the wire bobbin 21 has run out based on the input from the wire electrode detector 33. If the wire electrode presence/absence determination unit 211 determines that the wire electrode 10 on the wire bobbin 21 has run out, Yes is selected in step S409, and the operation is terminated. If the wire electrode presence/absence determination unit 211 does not determine that the wire electrode 10 on the wire bobbin 21 has run out, No is selected in step S409, and the operation proceeds to step S401.

Figure 12:
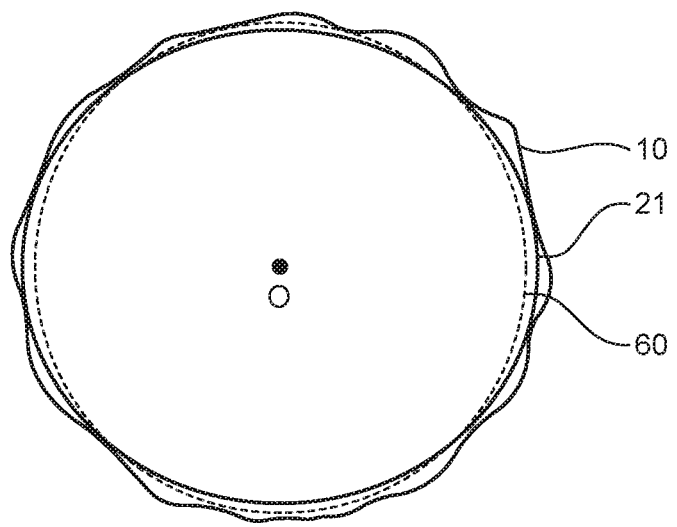
FIG. 12 is a view schematically illustrating a cross-section of a wire bobbin of the wire electric discharge machine according to the fourth embodiment.

FIG. 12 is a view schematically illustrating the cross-section of the wire bobbin of the wire electric discharge machine according to the fourth embodiment. In FIG. 12, the wire electrode 10 corresponding to one turn of the wire bobbin 21 is illustrated. The wire electrode 10 corresponding to one turn of the wire bobbin 21 is deviated from a perfect circle 60 which is coaxial with the central axis O of rotation of the wire bobbin 21 indicated by the broken line in FIG. 12, and the cross-sectional shape of the wire bobbin 21 itself is not a perfect circle. Therefore, eccentricity occurs in the wire bobbin 21 with the wire electrode 10 wound around. Therefore, in the long term, the bobbin draw-out diameter decreases as the wire electrode 10 travels, but in the short term, it increases and decreases repeatedly at a frequency higher than the rotation cycle of the wire bobbin 21. In the wire electric discharge machine 1 according to the fourth embodiment, the component of fluctuations in bobbin draw-out diameter generated at a frequency higher than the rotation cycle of the wire bobbin 21 due to the eccentricity of the wire bobbin 21 can be removed by the filter processing unit 208, so that the remaining length of the wire electrode 10 can be accurately calculated.

Fifth Embodiment

Figure 13:
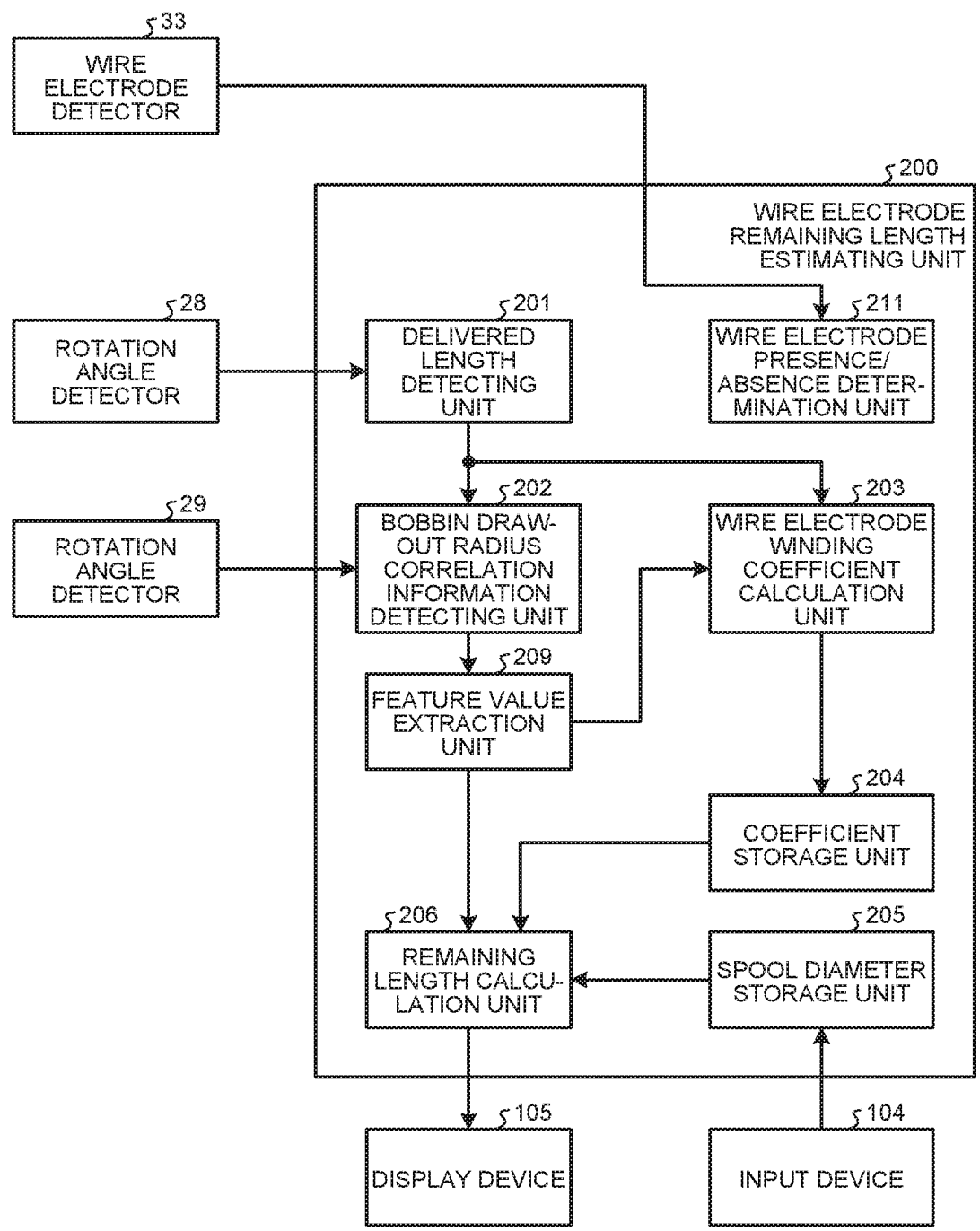
FIG. 13 is a functional block diagram of a wire electrode remaining length estimating unit of a wire electric discharge machine according to a fifth embodiment of the present invention.

The configuration of the wire electric discharge machine 1 according to the fifth embodiment of the present invention is similar to the configuration of the wire electric discharge machine 1 according to the third embodiment, and includes the wire electrode detector 33. FIG. 13 is a functional block diagram of a wire electrode remaining length estimating unit of the wire electric discharge machine according to the fifth embodiment of the present invention. The wire electric discharge machine 1 according to the fifth embodiment includes a feature value extraction unit 209 that extracts a feature value of bobbin draw-out diameter in a time span equal to or longer than a traverse cycle. The feature value may be, but is not limited to, the maximum value, the minimum value, the average value of the maximum value and the minimum value, or the overall average value. Note that "traverse" means that the position at which the wire electrode 10 wound around and delivered from the wire bobbin 21 is separated from the wire bobbin 21 moves in the direction along the central axis of rotation of the wire bobbin 21. A traverse cycle corresponds to a cycle in which the position at which the wire electrode 10 wound around and delivered from the wire bobbin 21 is separated from the wire bobbin 21 moves from one side to the other in the axial direction of the wire bobbin 21 and back again.

The feature value extraction unit 209 calculates a traverse cycle based on the current bobbin draw-out diameter.

Figure 14:
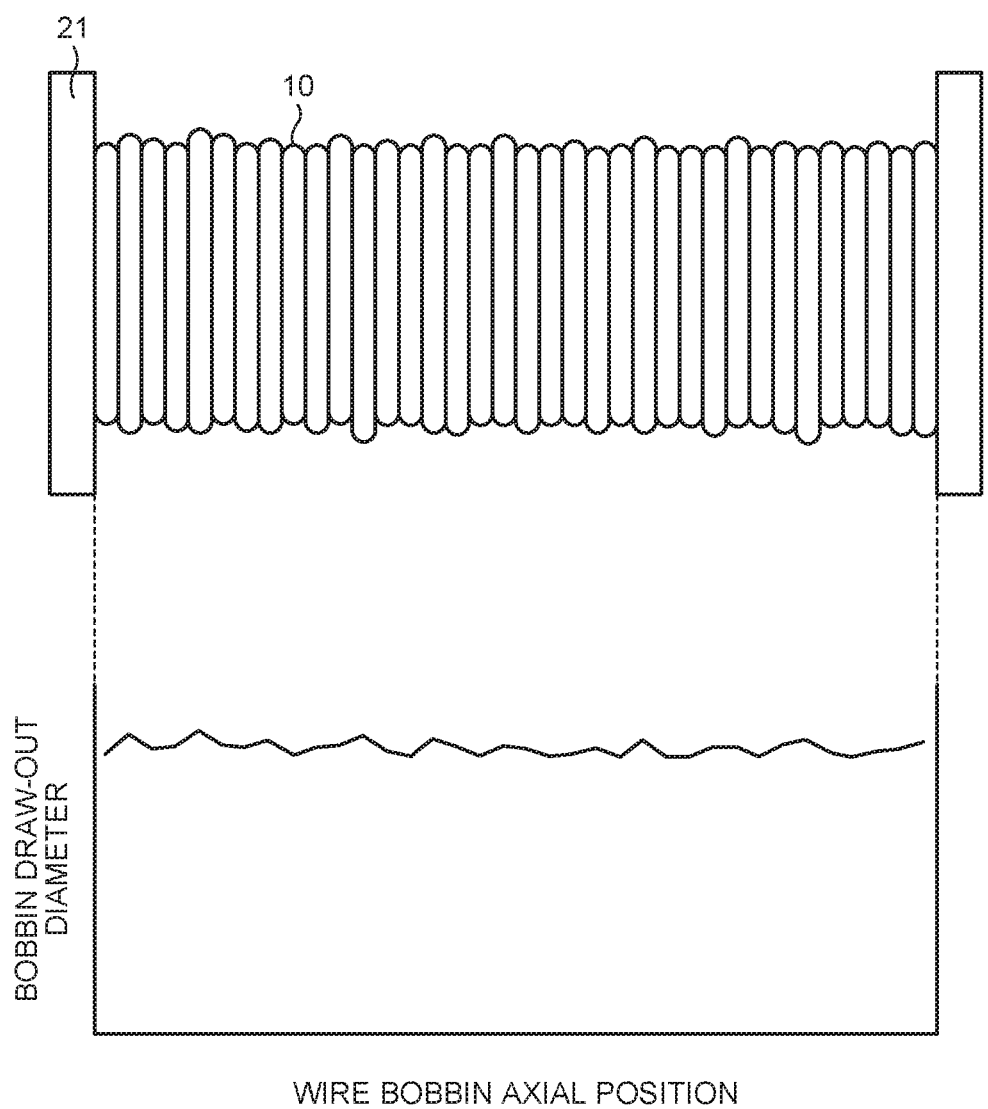
FIG. 14 is a diagram schematically illustrating the relationship between the wire bobbin axial position of the wire electrode wound around the wire bobbin and the bobbin draw-out diameter in the wire electric discharge machine according to the fifth embodiment.

FIG. 14 is a diagram schematically illustrating the relationship between the wire bobbin axial position of the wire electrode wound around the wire bobbin and the bobbin draw-out diameter in the wire electric discharge machine according to the fifth embodiment. The strength of winding the wire electrode 10 around the wire bobbin 21 varies in accordance with the axial position on the wire bobbin 21, and the spool diameter of the wire bobbin 21 is not fixed in the axial direction of the wire bobbin 21 due to manufacturing error. Therefore, the bobbin draw-out diameter periodically changes in accordance with the axial position on the wire bobbin 21 at which the wire electrode 10 wound around and delivered from the wire bobbin 21 is separated from the wire bobbin 21. Therefore, the bobbin draw-out diameter increase/decrease has the same periodicity as a traverse cycle.

Figure 15:
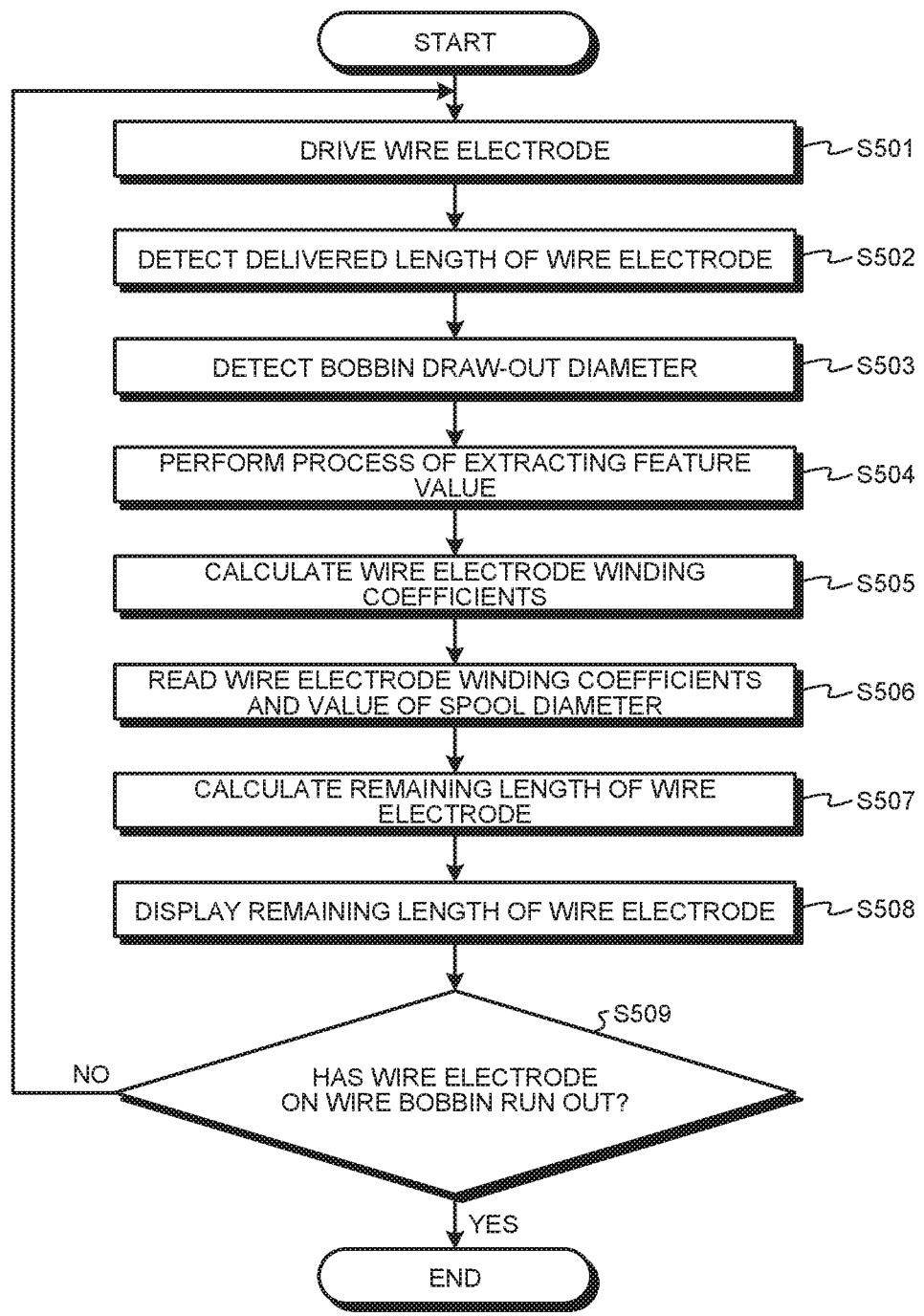
FIG. 15 is a flowchart illustrating the procedure for the operation of the wire electrode remaining length estimating unit of the wire electric discharge machine according to the fifth embodiment.

FIG. 15 is a flowchart illustrating the procedure for the operation of the wire electrode remaining length estimating unit of the wire electric discharge machine according to the fifth embodiment. The processes of steps S501 to S503 are similar to the processes of steps S101 to S103 in FIG. 3. In step S504, the feature value extraction unit 209 performs the process of extracting a feature value of bobbin draw-out diameter. The processes of steps S505 to S508 are similar to the processes of steps S104 to S107 in FIG. 3. In step S509, the wire electrode presence/absence determination unit 211 determines whether the wire electrode 10 on the wire bobbin 21 has run out based on the input from the wire electrode detector 33. If the wire electrode presence/absence determination unit 211 determines that the wire electrode 10 on the wire bobbin 21 has run out, Yes is selected in step S509, and the operation is terminated. If the wire electrode presence/absence determination unit 211 does not determine that the wire electrode 10 on the wire bobbin 21 has run out, No is selected in step S509, and the operation proceeds to step S501.

Figure 16:
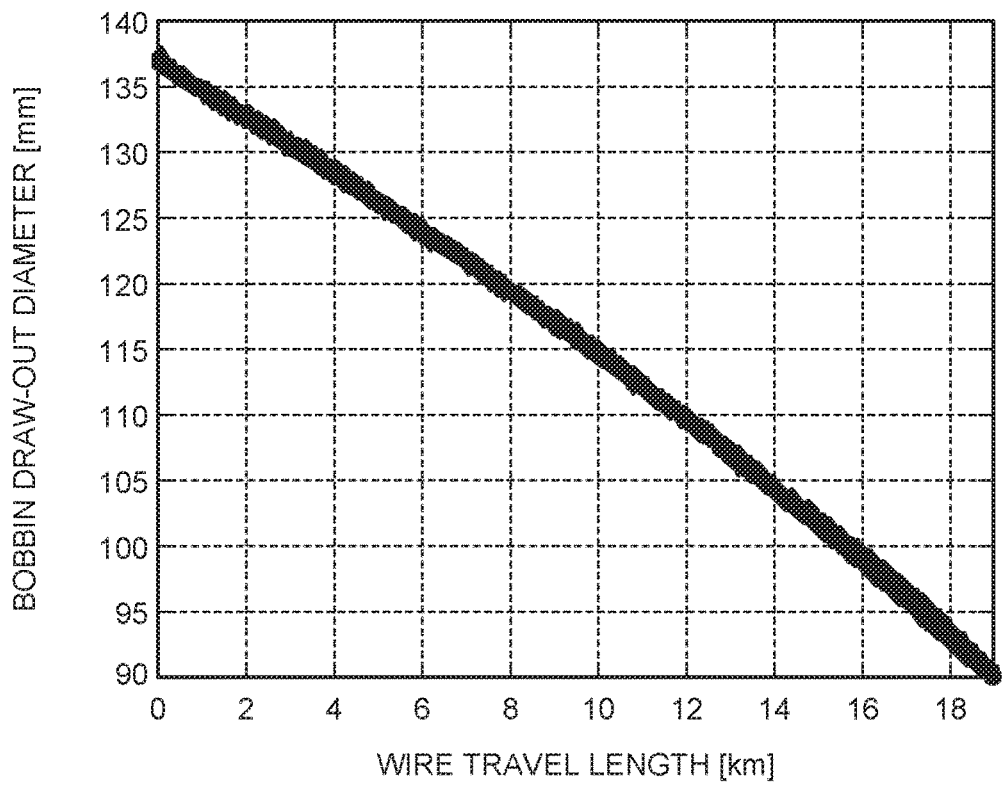
FIG. 16 is a diagram illustrating the relationship between the delivered length of the wire electrode and the bobbin draw-out diameter in the wire electric discharge machine according to the fifth embodiment.
Figure 17:
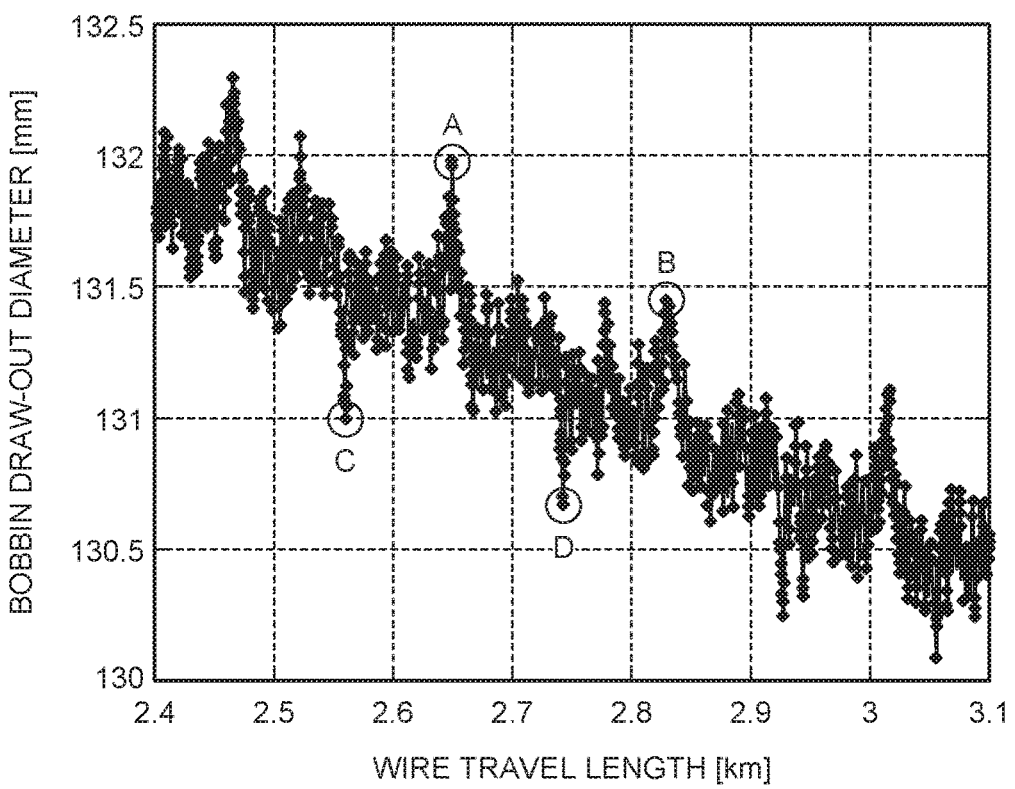
FIG. 17 is a diagram illustrating the relationship between the delivered length of the wire electrode and the bobbin draw-out diameter in the wire electric discharge machine according to the fifth embodiment.

FIGS. 16 and 17 are diagrams illustrating the relationship between the delivered length of the wire electrode and the bobbin draw-out diameter in the wire electric discharge machine according to the fifth embodiment. FIG. 17 is a partial enlarged diagram of FIG. 16. In the long term, the bobbin draw-out diameter decreases as the wire electrode 10 travels, but it increases and decreases repeatedly in the short term. As described above, the short-term increase/decrease in bobbin draw-out diameter has the same periodicity as a traverse cycle. Each of points A and B in FIG. 17 is the maximum bobbin draw-out diameter in a traverse cycle, and each of points C and D in FIG. 17 is the minimum bobbin draw-out diameter in a traverse cycle.

For example, if the wire electrode winding coefficients are calculated based on the difference in bobbin draw-out diameter between points A and C in FIG. 17 without considering fluctuations in bobbin draw-out diameter in the cycle equivalent to a traverse cycle, the calculated wire electrode winding coefficients are far different from the actual wire electrode winding coefficients. The wire electric discharge machine 1 according to the fifth embodiment includes the feature value extraction unit 209 that extracts the maximum value, the minimum value, the average value of the maximum value and the minimum value, or the overall average value of bobbin draw-out diameter in a time span equal to or longer than a traverse cycle. Therefore, the wire electric discharge machine 1 according to the fifth embodiment can estimate the remaining length of the wire electrode 10 by calculating the wire electrode winding coefficients without being affected by periodic fluctuations in bobbin draw-out diameter in a time span equal to or less than a traverse cycle. For example, the wire electrode remaining length estimating unit 200 of the wire electric discharge machine 1 according to the fifth embodiment can calculate the wire electrode winding coefficients based on the difference in bobbin draw-out diameter between point A and point B in FIG. 17 or the difference in bobbin draw-out diameter between point C and point D.

The wire electric discharge machine 1 according to the fifth embodiment can accurately estimate the remaining length of the wire electrode 10 by suppressing the influence of fluctuations in measurement values due to the uneven winding of the wire electrode 10 and the difference in spool diameter in the axial direction of the wire bobbin 21.

Sixth Embodiment

Figure 18:
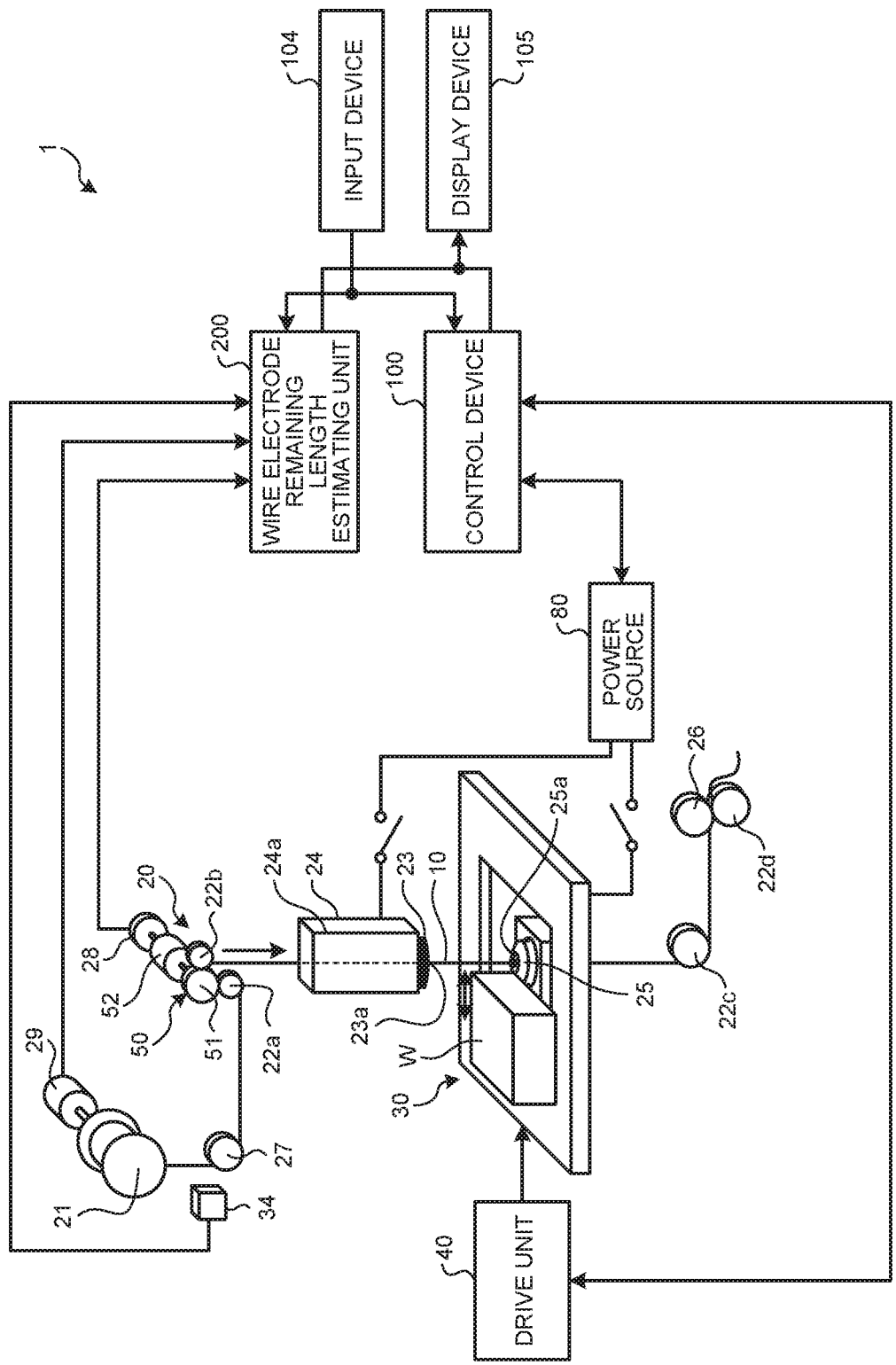
FIG. 18 is a diagram illustrating a configuration of a wire electric discharge machine according to a sixth embodiment of the present invention.

FIG. 18 is a diagram illustrating a configuration of a wire electric discharge machine according to the sixth embodiment of the present invention. The wire electric discharge machine according to the sixth embodiment is different from the wire electric discharge machine 1 according to the first embodiment in that it includes a reading device 34 that reads information displayed on the wire bobbin 21.

Note that the wire electrode draw-out position detector 31 may also be provided so that the bobbin draw-out diameter can be detected through measurement as in the wire electric discharge machine 1 according to the second embodiment. The wire electrode travel length detector 32 may also be provided so that the delivered length of the wire electrode 10 can be measured directly as in the wire electric discharge machine 1 according to the second embodiment.

Figure 19:
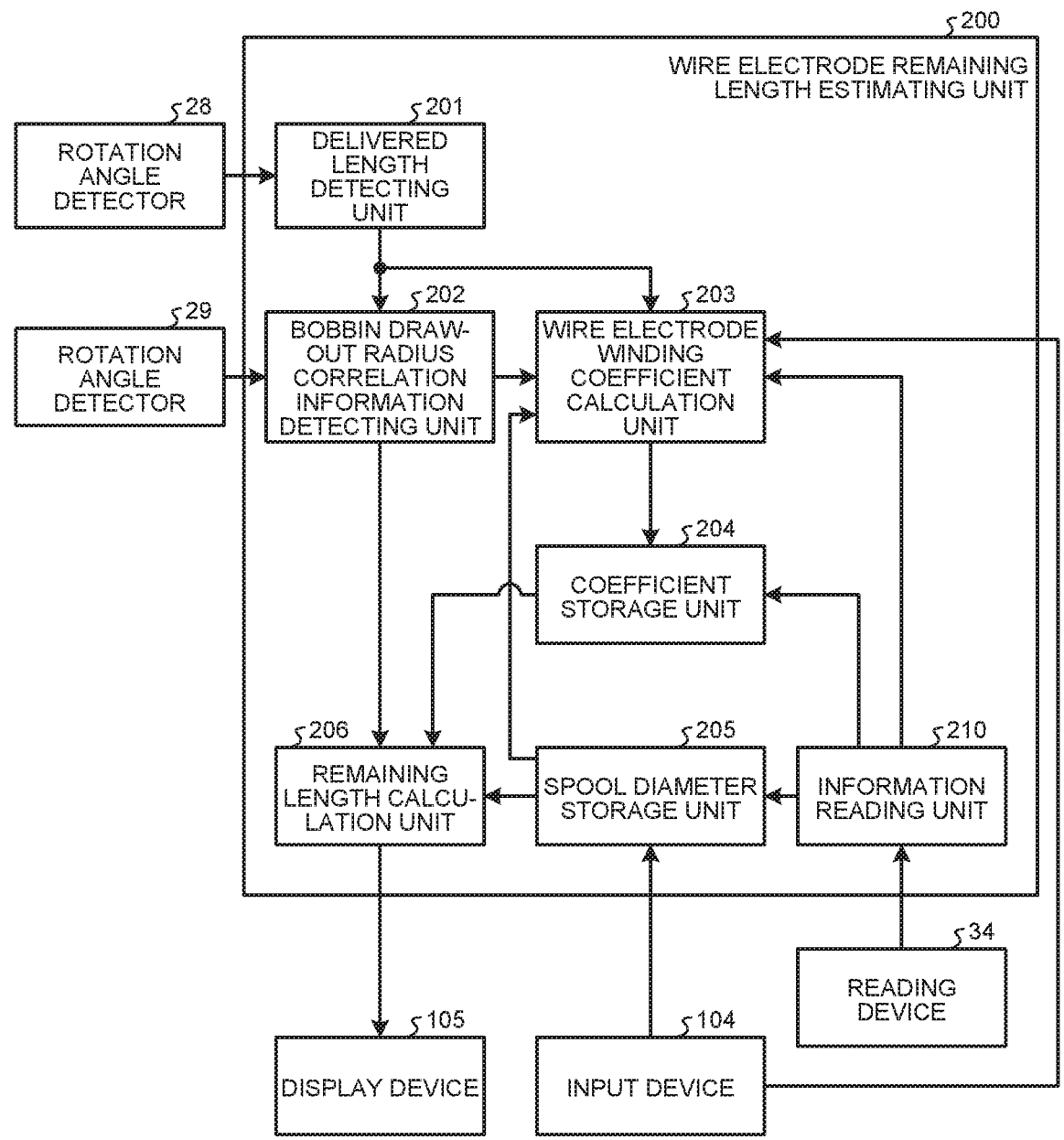
FIG. 19 is a functional block diagram of a wire electrode remaining length estimating unit of the wire electric discharge machine according to the sixth embodiment.

FIG. 19 is a functional block diagram of a wire electrode remaining length estimating unit of the wire electric discharge machine according to the sixth embodiment. The wire electrode remaining length estimating unit 200 of the wire electric discharge machine according to the sixth embodiment includes an information reading unit 210 that controls the reading device 34. The information reading unit 210 acquires, through the reading device 34, information displayed using a character string, bar code, or two-dimensional code. The information displayed on the wire bobbin 21 in the sixth embodiment is a value correlated with the bobbin draw-out radius in an unused state with the wire electrode 10 wound according to the standard. Hereinafter, a value correlated with the bobbin draw-out radius in an unused state with the wire electrode 10 wound according to the standard is also referred to as the bobbin draw-out diameter in an unused state. The information reading unit 210 outputs the bobbin draw-out diameter in an unused state read from the wire bobbin 21 to the wire electrode winding coefficient calculation unit 203.

Figure 20:
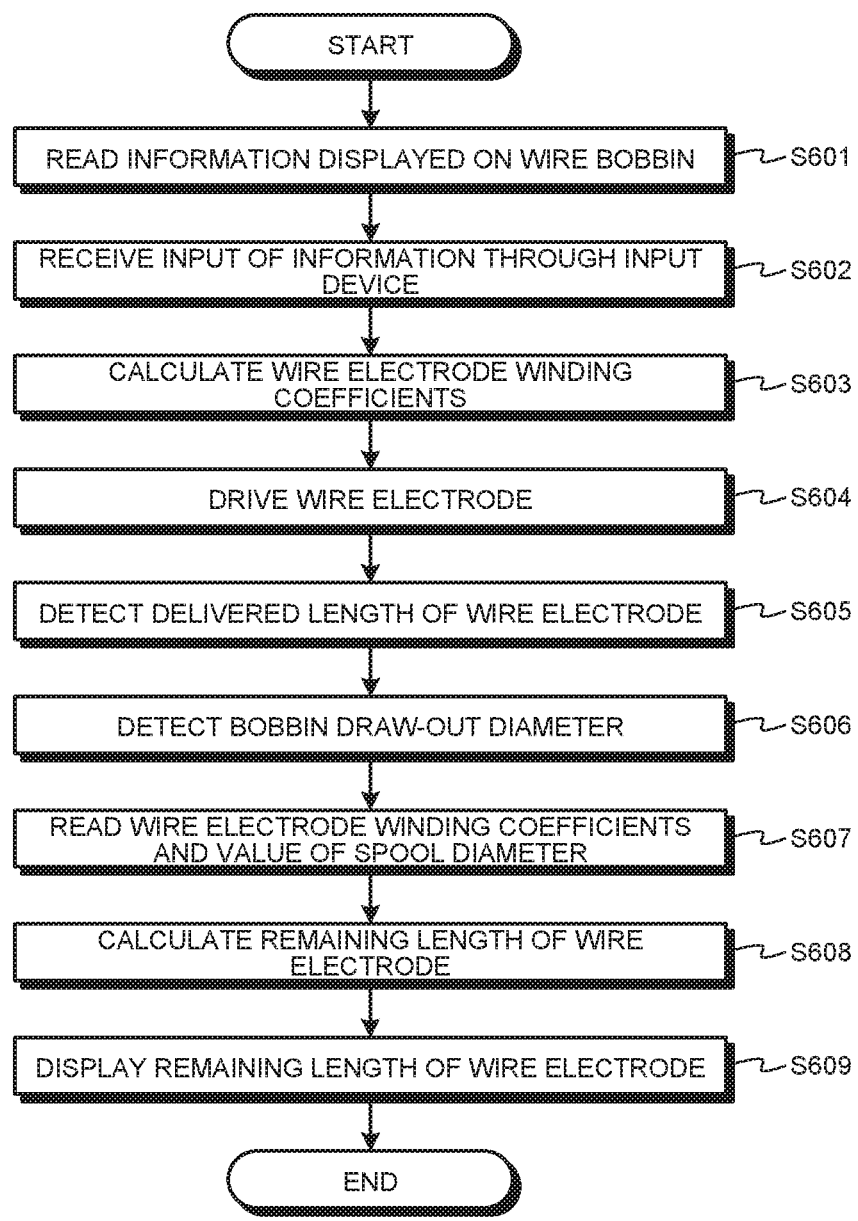
FIG. 20 is a flowchart illustrating the procedure for the operation of the wire electrode remaining length estimating unit of the wire electric discharge machine according to the sixth embodiment.

FIG. 20 is a flowchart illustrating the procedure for the operation of the wire electrode remaining length estimating unit of the wire electric discharge machine according to the sixth embodiment. In step S601, the information reading unit 210 reads information displayed on the wire bobbin 21.

If at least one of the wire electrode winding coefficients and the spool diameter is displayed on the wire bobbin 21 in addition to a value correlated with the bobbin draw-out radius in an unused state with the wire electrode 10 wound according to the standard, the information reading unit 210 also reads such information. When reading the wire electrode winding coefficients, the information reading unit 210 stores the wire electrode winding coefficients in the coefficient storage unit 204. When reading the spool diameter, the information reading unit 210 stores the value of the spool diameter in the spool diameter storage unit 205.

In step S602, the wire electrode winding coefficient calculation unit 203 receives input of information through the input device 104. To the wire electrode winding coefficient calculation unit 203, the length of the wire electrode 10 calculated from the mass per unit length of the wire electrode 10 and the mass of the wire electrode 10 wound around the wire bobbin 21 is input through the input device 104. Note that the mass per unit length of the wire electrode 10 and the mass of the wire electrode 10 wound around the wire bobbin 21 may be input to the wire electrode winding coefficient calculation unit 203 through the input device 104 so that the wire electrode winding coefficient calculation unit 203 can calculate the length of the wire electrode 10. If the spool diameter is not displayed on the wire bobbin 21, the spool diameter storage unit 205 stores the value of the spool diameter input through the input device 104.

In step S603, the wire electrode winding coefficient calculation unit 203 calculates the wire electrode winding coefficients. As described above, the wire electrode winding coefficients are expressed by the coefficient $k_1$ of the first order term, the coefficient $k_2$ of the quadratic term, and the coefficient $k_3$ of the constant term. Here, the wire electrode winding coefficients are approximated by the coefficient $k_2=K$ of the quadratic term. The length L of the wire electrode 10 calculated from the mass per unit length of the wire electrode 10 and the mass of the wire electrode 10 wound around the wire bobbin 21, the bobbin draw-out diameter D in an unused state, the spool diameter f, and the wire electrode winding coefficient K have a relationship of $L=K(D^2-f^2)$. Therefore, the wire electrode winding coefficient calculation unit 203 calculates the wire electrode winding coefficient K using $K=L/(D^2-f^2)$, and stores it in the coefficient storage unit 204. In a case where the information reading unit 210 stores the wire electrode winding coefficients read from the wire bobbin 21 in the coefficient storage unit 204, the wire electrode winding coefficients stored in the coefficient storage unit 204 are corrected.

The operations of steps S604 to S609 are similar to the operations of steps S101 to S103 and steps S105 to S107 in FIG. 3.

Note that the filtering process illustrated in step S404 of FIG. 11 or the feature value extracting process illustrated in step S504 of FIG. 15 may be performed after step S606.

The wire electric discharge machine according to the sixth embodiment calculates the remaining length of the wire electrode 10 by calculating the wire electrode winding coefficients based on a value correlated with the bobbin draw-out radius in an unused state. Therefore, the remaining length of the wire electrode 10 can be accurately estimated. Since the remaining length of the wire electrode 10 can be calculated even with the wire bobbin 21 that has already been used, the remaining length of the wire electrode 10 can be estimated even after the wire bobbin 21 is replaced or the disconnected wire electrode 10 is reconnected.

The wire electrode winding coefficient calculation unit 203 may correct the wire electrode winding coefficients based on the delivered length of the wire electrode 10 and the transition of bobbin draw-out diameter corresponding to the delivered length of the wire electrode 10.

Here, the configuration of the wire electrode remaining length estimating unit 200 of the wire electric discharge machine 1 according to any of the first to sixth embodiments will be described. The functions of the wire electrode remaining length estimating unit 200 in any of the first to sixth embodiments are realized by a processing circuit. That is, the wire electrode remaining length estimating unit 200 includes a processing circuit that performs the process of estimating the remaining length of the wire electrode 10. The processing circuit may be dedicated hardware or an arithmetic device that executes a program stored in the storage device.

Figure 21:
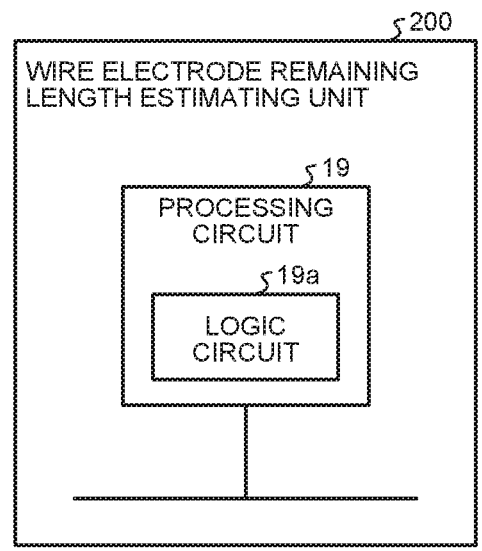
FIG. 21 is a diagram illustrating a configuration in which the functions of the wire electrode remaining length estimating unit of the wire electric discharge machine according to any of the first to sixth embodiments are realized by hardware.

FIG. 21 is a diagram illustrating a configuration in which the functions of the wire electrode remaining length estimating unit of the wire electric discharge machine according to any of the first to sixth embodiments are realized by hardware. In a case where a processing circuit 19 is dedicated hardware, the processing circuit 19 may be a single circuit, a composite circuit, a programmed processor, a parallel programmed processor, an application specific integrated circuit, a field programmable gate array, or a combination thereof. The processing circuit 19 incorporates a logic circuit 19a that realizes the process of detecting the delivered length of the wire electrode 10, the process of detecting the bobbin draw-out diameter, the process of detecting the wire electrode winding coefficients, the process of calculating the remaining length of the wire electrode, the process of displaying the remaining length of the wire electrode, the process of removing the component of fluctuations in bobbin draw-out diameter generated at a frequency higher than the rotation cycle of the wire bobbin 21, the process of extracting a feature value of bobbin draw-out diameter, or the process of reading information displayed on the wire bobbin 21.

In a case where the processing circuit 19 is an arithmetic device, each process of the wire electrode remaining length estimating unit 200 is realized by software, firmware, or a combination of software and firmware.

Figure 22:
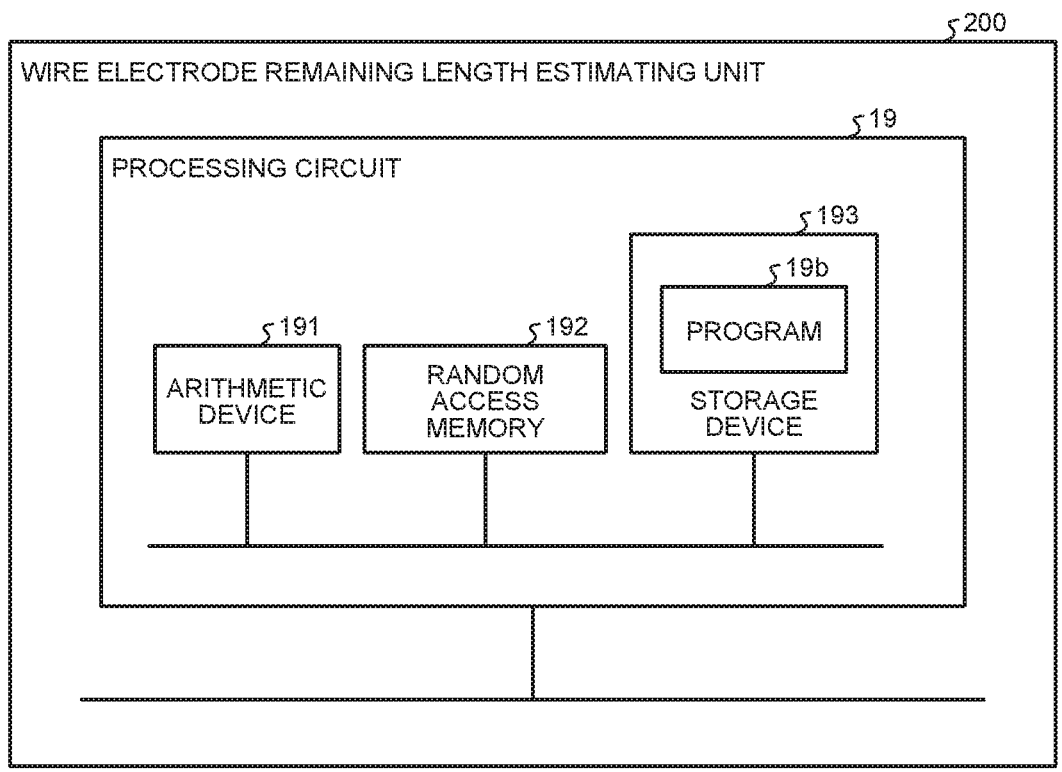
FIG. 22 is a diagram illustrating a configuration in which the functions of the wire electrode remaining length estimating unit of the wire electric discharge machine according to any of the first to sixth embodiments are realized by software.

FIG. 22 is a diagram illustrating a configuration in which the functions of the wire electrode remaining length estimating unit of the wire electric discharge machine according to any of the first to sixth embodiments are realized by software. The processing circuit 19 has an arithmetic device 191 for executing a program 19b, a random access memory 192 used as a work area by the arithmetic device 191, and a storage device 193 for storing the program 19b. The arithmetic device 191 develops and executes the program 19b stored in the storage device 193 on the random access memory 192, whereby each process of the wire electrode remaining length estimating unit 200 is realized. Software or firmware is described in a program language and stored in the storage device 193.

The processing circuit 19 realizes each process by reading and executing the program 19b stored in the storage device 193. That is, the wire electrode remaining length estimating unit 200 includes the storage device 193 for storing the program 19b that is executed by the processing circuit 19 to eventually execute the step of detecting the delivered length of the wire electrode 10, the step of detecting the bobbin draw-out diameter, the step of detecting the wire electrode winding coefficients, the step of calculating the remaining length of the wire electrode 10, the step of displaying the remaining length of the wire electrode 10, the step of removing the component of fluctuations in bobbin draw-out diameter generated at a frequency higher than the rotation cycle of the wire bobbin 21, the step of extracting a feature value of bobbin draw-out diameter, or the step of reading information displayed on the wire bobbin 21. It can also be said that the program 19b causes a computer to execute the above procedures and methods.

Note that a part of each process of the wire electrode remaining length estimating unit 200 may be realized by dedicated hardware, and the other part may be realized by software or firmware.

In this manner, the processing circuit 19 can realize each of the above-described functions using dedicated hardware, software, firmware, or a combination thereof.

The configuration described in the above-mentioned embodiments indicates an example of the contents of the present invention. The configuration can be combined with another well-known technique, and a part of the configuration can be omitted or changed in a range not departing from the gist of the present invention.

REFERENCE SIGNS LIST 1 wire electric discharge machine; 10 wire electrode; 19 processing circuit; 19a logic circuit; 19b program; 20 wire moving unit; 21 wire bobbin; 22a, 22b upper wire feed roller; 22c, 22d lower wire feed roller; 23 upper nozzle; 23a, 25a guide hole; 24 machining head; 24a head body; 25 lower nozzle; 26 collecting roller; 27 pulley; 28, 29 rotation angle detector; 30 workpiece holding unit; 31 wire electrode draw-out position detector; 32 wire electrode travel length detector; 33 wire electrode detector; 34 reading device; 40 drive unit; 50 tension applying unit; 51 tension applying roller; 52 motor; 80 power source; 100 control device; 104 input device; 105 display device; 200 wire electrode remaining length estimating unit; 201 delivered length detecting unit; 202 bobbin draw-out radius correlation information detecting unit; 203 wire electrode winding coefficient calculation unit; 204 coefficient storage unit; 205 spool diameter storage unit; 206 remaining length calculation unit; 207 spool diameter history unit; 208 filter processing unit; 209 feature value extraction unit; 210 information reading unit; 211 wire electrode presence/absence determination unit.

The invention claimed is:

1. A wire electric discharge machine for machining a workpiece by causing a discharge between a wire electrode delivered from a wire bobbin and the workpiece, the wire electric discharge machine comprising:
a pulley in contact with the wire electrode and arranged between the wire bobbin and a tension roller; and
a wire remaining length estimating circuitry configured to calculate a remaining length of the wire electrode based on wire electrode winding coefficients, bobbin draw-out radius correlation information, and a spool diameter of the wire bobbin, the wire electrode winding coefficients representing a winding state of the wire electrode on the wire bobbin, the bobbin draw-out radius correlation information being correlated with a bobbin draw-out radius that is a distance between a position at which the wire electrode wound around the wire bobbin is separated from the wire bobbin and a central axis of rotation of the wire bobbin, wherein the wire electrode winding coefficients depend on an inner width of the wire bobbin, a wire diameter of the wire electrode, and a winding tension of the wire electrode; and
the wire remaining length estimating circuitry is further configured to calculate the bobbin draw-out radius based on a rotation angle of the pulley.

2. A wire electric discharge machine for machining a workpiece by causing a discharge between a wire electrode delivered from a wire bobbin and the workpiece, the wire electric discharge machine comprising:
a pulley in contact with the wire electrode and arranged between the wire bobbin and a tension roller;
remaining length calculation circuitry configured to calculate a remaining length of the wire electrode based on wire electrode winding coefficients, bobbin draw-out radius correlation information, and a spool diameter of the wire bobbin, the wire electrode winding coefficients representing a winding state of the wire electrode on the wire bobbin, the bobbin draw-out radius correlation information being correlated with a bobbin draw-out radius that is a distance between a position at which the wire electrode wound around the wire bobbin is separated from the wire bobbin and a central axis of rotation of the wire bobbin;
bobbin draw-out radius correlation information detection circuitry configured to detect the bobbin draw-out radius correlation information based on a rotation angle of the pulley;
a coefficient memory to store the wire electrode winding coefficients;
a spool diameter memory to store the spool diameter;
delivered length detecting circuitry configured to detect a delivered length of the wire electrode; and
a wire electrode winding coefficient calculation circuitry configured to calculate the wire electrode winding coefficients based on the delivered length and transition of the bobbin draw-out radius correlation information corresponding to the delivered length of the wire electrode, and store the wire electrode winding coefficients in the coefficient memory.

3. A wire electric discharge machine for machining a workpiece by causing a discharge between a wire electrode delivered from a wire bobbin and the workpiece, the wire electric discharge machine comprising:
a pulley in contact with the wire electrode and arranged between the wire bobbin and a tension roller;
remaining length calculation circuitry configured to calculate a remaining length of the wire electrode based on wire electrode winding coefficients, bobbin draw-out radius correlation information, and a spool diameter of the wire bobbin, the wire electrode winding coefficients representing a winding state of the wire electrode on the wire bobbin, the bobbin draw-out radius correlation information being correlated with a bobbin draw-out radius that is a distance between a position at which the wire electrode wound around the wire bobbin is separated from the wire bobbin and a central axis of rotation of the wire bobbin;
bobbin draw-out radius correlation information detection circuitry configured to detect the bobbin draw-out radius correlation information;
a coefficient memory to store the wire electrode winding coefficients;
a spool diameter memory to store the spool diameter; and
delivered length detecting circuitry configured to detect a delivered length of the wire electrode, wherein
the bobbin draw-out radius correlation information detecting circuitry is further configured to detect a rotation speed of the pulley and detect the bobbin draw-out radius correlation information based on the delivered length and the rotation speed of the pulley.

4. A wire electric discharge machine for machining a workpiece by causing a discharge between a wire electrode delivered from a wire bobbin and the workpiece, the wire electric discharge machine comprising:
- a pulley in contact with the wire electrode and arranged between the wire bobbin and a tension roller;
- remaining length calculation circuitry configured to calculate a remaining length of the wire electrode based on wire electrode winding coefficients, bobbin draw-out radius correlation information, and a spool diameter of the wire bobbin, the wire electrode winding coefficients representing a winding state of the wire electrode on the wire bobbin, the bobbin draw-out radius correlation information being correlated with a bobbin draw-out radius that is a distance between a position at which the wire electrode wound around the wire bobbin is separated from the wire bobbin and a central axis of rotation of the wire bobbin;
- bobbin draw-out radius correlation information detection circuitry configured to detect the bobbin draw-out radius correlation information based on a rotation angle of the pulley;
- a coefficient memory to store the wire electrode winding coefficients;
- a spool diameter memory to store the spool diameter;
- information reading circuitry configured to read the bobbin draw-out radius correlation information in an unused state displayed on the wire bobbin; and
- wire electrode winding coefficient calculation circuitry configured to calculate the wire electrode winding coefficients based on a length of the wire electrode calculated from a mass per unit length of the wire electrode and a mass of the wire electrode wound around the wire bobbin, the bobbin draw-out radius correlation information in an unused state, and the spool diameter.

5. The wire electric discharge machine according to claim 4, further comprising:
- delivered length detecting circuitry configured to detect a delivered length of the wire electrode,
- wherein the wire electrode winding coefficient calculation circuitry corrects the wire electrode winding coefficients based on the delivered length and transition of the bobbin draw-out radius correlation information corresponding to the delivered length of the wire electrode.

6. The wire electric discharge machine according to claim 2, wherein the bobbin draw-out radius correlation information is a bobbin draw-out diameter that is double the bobbin draw-out radius, and
the wire electric discharge machine further includes:
- a wire electrode detector to detect that the wire electrode on the wire bobbin has run out; and
- spool diameter history recording circuitry configured to regard the bobbin draw-out diameter as the spool diameter once the wire electrode detector detects that the wire electrode on the wire bobbin has run out, and store the bobbin draw-out diameter in the spool diameter memory.

7. The wire electric discharge machine according to claim 2, comprising:
- filter processing circuitry configured to remove a frequency component equal to or higher than a rotational frequency of the wire bobbin from the transition of the bobbin draw-out radius correlation information corresponding to the delivered length of the wire electrode.

8. The wire electric discharge machine to claim 2, further comprising:
- feature value extraction circuitry configured to extract transition of a feature value of the bobbin draw-out radius correlation information in a time span equal to or longer than a cycle in which the position at which the wire electrode wound around the wire bobbin is separated from the wire bobbin moves in a direction along the central axis of rotation of the wire bobbin,
- wherein the remaining length calculation circuitry calculates the remaining length of the wire electrode based on the delivered length corresponding to the span of extraction of the feature value, the transition of the feature value in the span of extraction of the feature value, the wire electrode winding coefficients, and the spool diameter.

9. The wire electric discharge machine according to claim 3, wherein the bobbin draw-out radius correlation information is a bobbin draw-out diameter that is double the bobbin draw-out radius, and
the wire electric discharge machine further includes:
- a wire electrode detector to detect that the wire electrode on the wire bobbin has run out; and
- spool diameter history recording circuitry configured to regard the bobbin draw-out diameter as the spool diameter once the wire electrode detector detects that the wire electrode on the wire bobbin has run out, and store the bobbin draw-out diameter in the spool diameter memory.

10. The wire electric discharge machine according to claim 4, wherein the bobbin draw-out radius correlation information is a bobbin draw-out diameter that is double the bobbin draw-out radius, and
the wire electric discharge machine includes:
- a wire electrode detector to detect that the wire electrode on the wire bobbin has run out; and
- spool diameter history recording circuitry configured to regard the bobbin draw-out diameter as the spool diameter once the wire electrode detector detects that the wire electrode on the wire bobbin has run out, and store the bobbin draw-out diameter in the spool diameter memory.

11. The wire electric discharge machine according to claim 5, wherein the bobbin draw-out radius correlation information is a bobbin draw-out diameter that is double the bobbin draw-out radius, and
the wire electric discharge machine includes:
- a wire electrode detector to detect that the wire electrode on the wire bobbin has run out; and
- spool diameter history recording circuitry configured to regard the bobbin draw-out diameter as the spool diameter once the wire electrode detector detects that the wire electrode on the wire bobbin has run out, and store the bobbin draw-out diameter in the spool diameter memory.

12. The wire electric discharge machine according to claim 3, further comprising:
- filter processing circuitry configured to remove a frequency component equal to or higher than a rotational frequency of the wire bobbin from the transition of the bobbin draw-out radius correlation information corresponding to the delivered length of the wire electrode.

13. The wire electric discharge machine according to claim 5, further comprising:
- filter processing circuitry configured to remove a frequency component equal to or higher than a rotational frequency of the wire bobbin from the transition of the bobbin draw-out radius correlation information corresponding to the delivered length of the wire electrode.

14. The wire electric discharge machine according to claim 3, comprising:
feature value extracting circuitry configured to extract transition of a feature value of the bobbin draw-out radius correlation information in a time span equal to or longer than a cycle in which the position at which the wire electrode wound around the wire bobbin is separated from the wire bobbin moves in a direction along the central axis of rotation of the wire bobbin,
wherein the remaining length calculation circuitry calculates the remaining length of the wire electrode based on the delivered length corresponding to the span of extraction of the feature value, the transition of the feature value in the span of extraction of the feature value, the wire electrode winding coefficients, and the spool diameter.

15. The wire electric discharge machine according to claim 5, comprising:
feature value extracting circuitry configured to extract transition of a feature value of the bobbin draw-out radius correlation information in a time span equal to or longer than a cycle in which the position at which the wire electrode wound around the wire bobbin is separated from the wire bobbin moves in a direction along the central axis of rotation of the wire bobbin, wherein
the remaining length calculation circuitry calculates the remaining length of the wire electrode based on the delivered length corresponding to the span of extraction of the feature value, the transition of the feature value in the span of extraction of the feature value, the wire electrode winding coefficients, and the spool diameter.

16. The wire electric discharge machine according to claim 1, wherein the wire remaining length estimating circuitry is further configured to determine the bobbin draw-out radius based on a diameter of the pulley, a detected rotation angle of the pulley, and a detected rotation angle of the wire bobbin.

17. The wire electric discharge machine according to claim 1, wherein the wire remaining length estimating circuitry is further configured to calculate the bobbin draw-out radius correlation information as a ratio between a detected rotation speed of the pulley and a detected rotation speed of the wire bobbin.

* * * * *